US008860847B2

(12) United States Patent
Akifusa et al.

(10) Patent No.: US 8,860,847 B2
(45) Date of Patent: Oct. 14, 2014

(54) COMPUTER-READABLE STORAGE MEDIUM HAVING STORED THEREON IMAGE GENERATION PROGRAM, CAPTURING APPARATUS, CAPTURING SYSTEM, AND IMAGE GENERATION METHOD FOR CREATING AN IMAGE

(75) Inventors: Yusuke Akifusa, Kyoto (JP); Naoko Mori, Kyoto (JP); Misuzu Yoshida, Kyoto (JP); Asako Kagita, Kyoto (JP); Takaya Yamane, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 217 days.

(21) Appl. No.: 13/247,273

(22) Filed: Sep. 28, 2011

(65) Prior Publication Data

US 2012/0075503 A1 Mar. 29, 2012

(30) Foreign Application Priority Data

Sep. 28, 2010 (JP) ................. 2010-217532

(51) Int. Cl.
*H04N 5/262* (2006.01)
*H04N 5/222* (2006.01)
*G06K 9/00* (2006.01)
*H04N 5/232* (2006.01)

(52) U.S. Cl.
CPC .......... *H04N 5/2621* (2013.01); *A63F 2300/69* (2013.01); *A63F 2300/204* (2013.01); *A63F 2300/1093* (2013.01); *H04N 5/23219* (2013.01)

USPC ................. 348/239; 348/333.04; 382/118

(58) Field of Classification Search
CPC .................. H04N 5/23219; H04N 5/2621
USPC ......... 348/239, 333.04–333.06; 382/118, 224
See application file for complete search history.

(56) References Cited

U.S. PATENT DOCUMENTS

| | | | | |
|---|---|---|---|---|
| 2008/0013787 | A1* | 1/2008 | Kobayashi | 382/103 |
| 2010/0142762 | A1* | 6/2010 | Morita | 382/115 |
| 2010/0157084 | A1* | 6/2010 | Shimamura et al. | 348/222.1 |
| 2010/0182447 | A1 | 7/2010 | Namba et al. | |
| 2011/0123118 | A1* | 5/2011 | Nayar et al. | 382/190 |
| 2012/0005595 | A1* | 1/2012 | Gavade et al. | 715/751 |
| 2012/0094754 | A1* | 4/2012 | Suzuki et al. | 463/30 |

FOREIGN PATENT DOCUMENTS

| | | |
|---|---|---|
| JP | 2006-148326 | 6/2006 |
| JP | 2006-344199 A | 12/2006 |
| JP | 2007-300562 A | 11/2007 |
| JP | 2009-225398 A | 10/2009 |
| WO | WO 2009/001530 A1 | 12/2008 |

* cited by examiner

*Primary Examiner* — Mekonnen Dagnew
(74) *Attorney, Agent, or Firm* — Nixon & Vanderhye, P.C.

(57) ABSTRACT

In an exemplary capturing apparatus, a first captured image captured by a capturing section is acquired. Then, it is determined whether or not a face image is included in the first captured image. When it is determined that a face image is included, any one type of image processing is selected from a plurality of types of image processing including a type of image processing using the face image, and the selected type of image processing is performed on the first captured image.

14 Claims, 19 Drawing Sheets

COMPUTER-READABLE STORAGE MEDIUM HAVING STORED THEREON IMAGE GENERATION PROGRAM, CAPTURING APPARATUS, CAPTURING SYSTEM, AND IMAGE GENERATION METHOD FOR CREATING AN IMAGE

CROSS REFERENCE TO RELATED APPLICATION

The disclosure of Japanese Patent Application No. 2010-217532, filed on Sep. 28, 2010, is incorporated herein by reference.

FIELD

The exemplary embodiments described herein relate to a computer-readable storage medium having stored thereon an image generation program to be executed by a computer of a capturing apparatus, a capturing apparatus, a capturing system, and an image generation method, and in particular, relate to a computer-readable storage medium having stored thereon an image generation program to be executed by a computer of a capturing apparatus that uses a face recognition function to perform image processing on a captured image obtained by capturing the face of a person or the like, a capturing apparatus, a capturing system, and an image generation method that use a face recognition function to perform image processing on a captured image obtained by capturing the face of a person or the like.

BACKGROUND AND SUMMARY

In recent years, capturing apparatuses are highly functional, and a capturing apparatus does not only simply record an image obtained by photographing, but also performs various types of image processing. Examples of the types of image processing include a process of: using a face recognition function to detect a person's face from an image obtained by photographing a person; and correcting a skin tone portion of the detected face.

Incidentally, the image processing function of the capturing apparatus is effective in taking a clearer picture. If, however, the same subject is photographed by the same capturing apparatus, similar types of image processing are performed, and similar pictures are photographed. This is predictable and has a reduced effect in providing interest to a user of the capturing apparatus.

Therefore, it is a feature of the exemplary embodiments to provide a computer-readable storage medium having stored thereon an image generation program capable of obtaining an unpredictable and interesting captured image, a capturing apparatus, a capturing system, and a image generation method that are capable of obtaining an unpredictable and interesting captured image.

One illustrative exemplary computer-readable storage medium having stored thereon an image generation program is a computer-readable storage medium having stored thereon an image generation program to be executed by a computer of a capturing apparatus, the image generation program causing the computer to function as image acquisition means, first determination means, image processing method selection means, and image processing means. The image acquisition means acquires, as a first captured image, an image captured by a capturing section. The first determination means determines whether or not a face image representing a face is included in the first captured image acquired by the image acquisition means. The image processing method selection means, when the first determination means has determined that a face image is included in the first captured image, randomly selects any one type of image processing from a plurality of types of image processing including a type of image processing using the face image. The image processing means performs the type of image processing selected by the image processing method selection means on the first captured image.

For example, when a user of a capturing apparatus has performed a predetermined operation, an image captured by the capturing section is acquired as a first captured image. When the first captured image has been acquired, it is determined whether or not a face image is included in the first captured image. Then, when it is determined that a face image is included in the first captured image, any one type of image processing is randomly selected from a plurality of types of image processing, and the selected type of image processing is performed on the first captured image. The performance of the randomly selected type of image processing in such a manner makes it possible to obtain an unpredictable captured image subjected to an type of image processing unintended by the user of the capturing apparatus. It should be noted that types of image processing that can be selected include a type of image processing using the face image included in the first captured image. This makes it possible to obtain a captured image that is not only unpredictable but interesting, when the type of image processing using the face image has been selected and performed on the first captured image.

It should be noted that examples of the type of image processing using the face image included in the first captured image include: a process of copying the face image included in the first captured image and inserting a copy of the face image into the first captured image; a process of copying the face image included in the first captured image, enlarging or reducing a copy of the face image, and inserting the enlarged or reduced copy into the first captured image; and a process of replacing face images included in the first captured image with each other. The type of image processing using the face image included in the first captured image, however, is not limited to the types of image processing exemplified here, so long as it is a type of image processing using the face image.

The computer may be further caused to function as: storage control means for storing, as a second captured image in a memory, an image captured in advance by the capturing section; and second determination means for determining whether or not a face image representing a face is included in the second captured image. In this case, when the second determination means has determined that a face image is included in the second captured image, the image processing method selection means randomly selects any one type of image processing from the plurality of types of image processing including a type of image processing using the face image.

With this configuration, types of image processing that can be selected by the image processing method selection means include a type of image processing using a face image included in a second captured image stored in advance in a memory. That is, it is possible to select a type of image processing using a face image not included in the first captured image acquired in real time. This makes it possible, when the type of image processing using the face image included in the second captured image has been selected and performed on the first captured image, to obtain a captured image that is more unpredictable and interesting than the case where the type of image processing using the face image included in the first captured image is selected.

It should be noted that examples of the type of image processing using the face image included in the second captured image include: a process of inserting the face image included in the second captured image into the first captured image; and a process of replacing the face image included in the first captured image with the face image included in the second captured image. A type of image processing using the face image included in the second captured image, however, is not limited to the types of image processing exemplified here, so long as it is a type of image processing using the face image.

The computer may be further caused to function as first display control means for causing the first captured image, on which the image processing means has performed the type of image processing, to be displayed on display means included in the capturing apparatus.

With this configuration, the first captured image on which the type of image processing has been performed by the image processing means is displayed on the display means. This enables the user of the capturing apparatus to easily confirm the results of the type of image processing.

The computer may be caused to function as second display control means for causing, instead of an image captured in real time by the capturing section, a substitute image to be displayed on display means included in the capturing apparatus, the substitute image not including the image.

Incidentally, when an image captured in real time by the capturing section is displayed on the display means, the user of the capturing apparatus may easily predict the results of the type of the image processing from the display content. With the above configuration, an image captured in real time by the capturing section is not displayed on the display means. This makes it possible to prevent the decrease in the unpredictability of an image obtained by performing a type of image processing. It should be noted that the display period of a substitute image is not particularly limited. For example, the form may be such that the substitute image is caused to be continuously displayed on the display means from the time before the first captured image is acquired to the time when the first captured image subjected to the type of image processing is displayed.

The computer may be further caused to function as position specifying means for specifying a position of a face image representing a face included in the image captured in real time by the capturing section. In this case, the second display control means causes the substitute image, including a marker image that implies the position of the face image specified by the position specifying means, to be displayed on the display means.

If a face image representing a face is not included in the first captured image captured by the capturing section, it is not possible to select and perform a type of image processing using the face image. With the above configuration, the substitute image including a marker image that implies the position of a face photographed by the capturing section is displayed on the display means. This enables the user of the capturing apparatus to perform photographing while viewing the substitute image such that the face is included in the screen of the display means, and thereby intentionally create a situation where a captured image subjected to a type of image processing using the face image is easily obtained.

The first determination means may determine whether or not a plurality of face images are included in the first captured image. In this case, when the first determination means has determined that a plurality of face images are included in the first captured image, the image processing method selection means randomly selects any one type of image processing from the plurality of types of image processing including a type of image processing of replacing the plurality of face images with each other.

With this configuration, when the faces of a plurality of people have been photographed by the capturing section, it is possible to obtain an unpredictable and interesting captured image in which the faces of the plurality of people are replaced with each other and which therefore differs greatly from a situation in real space.

When the first determination means has determined that a face image is included in the first captured image, the image processing method selection means may randomly select any one type of image processing from the plurality of types of image processing including a type of image processing of copying the face image and inserting a copy of the face image into the first captured image.

With this configuration, when a face has been photographed by the capturing section, it is possible to obtain an unpredictable and interesting captured image in which a face appears as in a ghost picture at a position where it should not be and which therefore differs greatly from a situation in real space.

When the second determination means has determined that a face image is included in the second captured image, the image processing method selection means may randomly select any one type of image processing from the plurality of types of image processing including a type of image processing of inserting the face image into the first captured image.

With this configuration, it is possible to obtain an unpredictable and interesting captured image in which a face not present in front of the capturing section appears and which therefore differs greatly from a situation in real space. It should be noted that a face image not included in the first captured image is inserted into the first captured image. This makes it possible to obtain a captured image that is more unpredictable and interesting than the case where the face image included in the first captured image is copied and a copy of the face image is inserted into the first captured image.

When the first determination means has determined that a face image is included in the first captured image, and also the second determination means has determined that a face image is included in the second captured image, the image processing method selection means may randomly select any one type of image processing from the plurality of types of image processing including a type of image processing of replacing the face image included in the first captured image with the face image included in the second captured image.

With this configuration, it is possible to obtain an unpredictable and interesting captured image in which a face that should be included in the first captured image appears as a face not present in front of the capturing section and which therefore differs greatly from a situation in real space.

When the second determination means has determined that a face image is not included in the second captured image, the image processing method selection means randomly selects a type of image processing using no face image.

If a type of image processing using a face image has been selected consecutively by the image processing method selection means, the unpredictability of a captured image to be obtained by performing a type of image processing may decrease. With the above configuration, a type of image processing using a face image and a type of image processing using no face image are randomly selected. Accordingly, a captured image subjected to a type of image processing using a face image may be obtained, or a captured image subjected to a type of image processing using no face image may be obtained. This makes it possible to suppress the decrease in the unpredictability of a captured image to be obtained by performing a type of image processing.

The exemplary embodiments can also be regarded as a capturing apparatus including image acquisition means, first determination means, image processing method selection means, and image processing means. The image acquisition means acquires, as a first captured image, an image captured by a capturing section. The first determination means determines whether or not a face image representing a face is included in the first captured image acquired by the image acquisition means. The image processing method selection means, when the first determination means has determined that a face image is included in the first captured image, randomly selects any one type of image processing from a plurality of types of image processing including a type of image processing using the face image. The image processing means performs the type of image processing selected by the image processing method selection means on the first captured image.

In addition, the exemplary embodiments can also be regarded as a capturing system including image acquisition means, first determination means, image processing method selection means, and image processing means. The image acquisition means acquires, as a first captured image, an image captured by a capturing section. The first determination means determines whether or not a face image representing a face is included in the first captured image acquired by the image acquisition means. The image processing method selection means, when the first determination means has determined that a face image is included in the first captured image, randomly selects any one type of image processing from a plurality of types of image processing including a type of image processing using the face image. The image processing means performs the type of image processing selected by the image processing method selection means on the first captured image.

In addition, the exemplary embodiments can also be regarded as an image generation method to be performed by a capturing apparatus. In the image generation method, first, an image captured by a capturing section is acquired as a first captured image. Next, it is determined whether or not a face image representing a face is included in the acquired first captured image. Subsequently, when it is determined that a face image is included in the first captured image, any one type of image processing is randomly selected from a plurality of types of image processing including a type of image processing using the face image. Then, the type of image processing selected in the selection step is performed on the first captured image.

Based on the exemplary embodiments, the performance of a randomly selected type of image processing on a first captured image makes it possible to obtain an unpredictable captured image subjected to an type of image processing unintended by a user of a capturing apparatus. Further, as a type of image processing to be performed on the first captured image, a type of image processing using a face image included in the first captured image can be selected. This makes it possible to obtain a captured image that is not only unpredictable but interesting, by selecting the type of image processing using the face image and performing the type of image processing on the first captured image.

These and other objects, features, aspects and advantages of the exemplary embodiments will become more apparent from the following detailed description of the exemplary embodiments when taken in conjunction with the accompanying drawings.

DETAILED DESCRIPTION OF NON-LIMITING EXEMPLARY EMBODIMENTS

With appropriate reference to the drawings, a description is given below of a capturing apparatus that executes an image generation program. It should be noted that the image generation program and the capturing apparatus can be applied to a given computer system. In the present embodiment, however, a description is given, by way of example, of the case where the image generation program stored in an external memory 45 is executed by a hand-held game apparatus 10 as an example of the capturing apparatus.

[Configuration of Game Apparatus 10]

Figure 1:
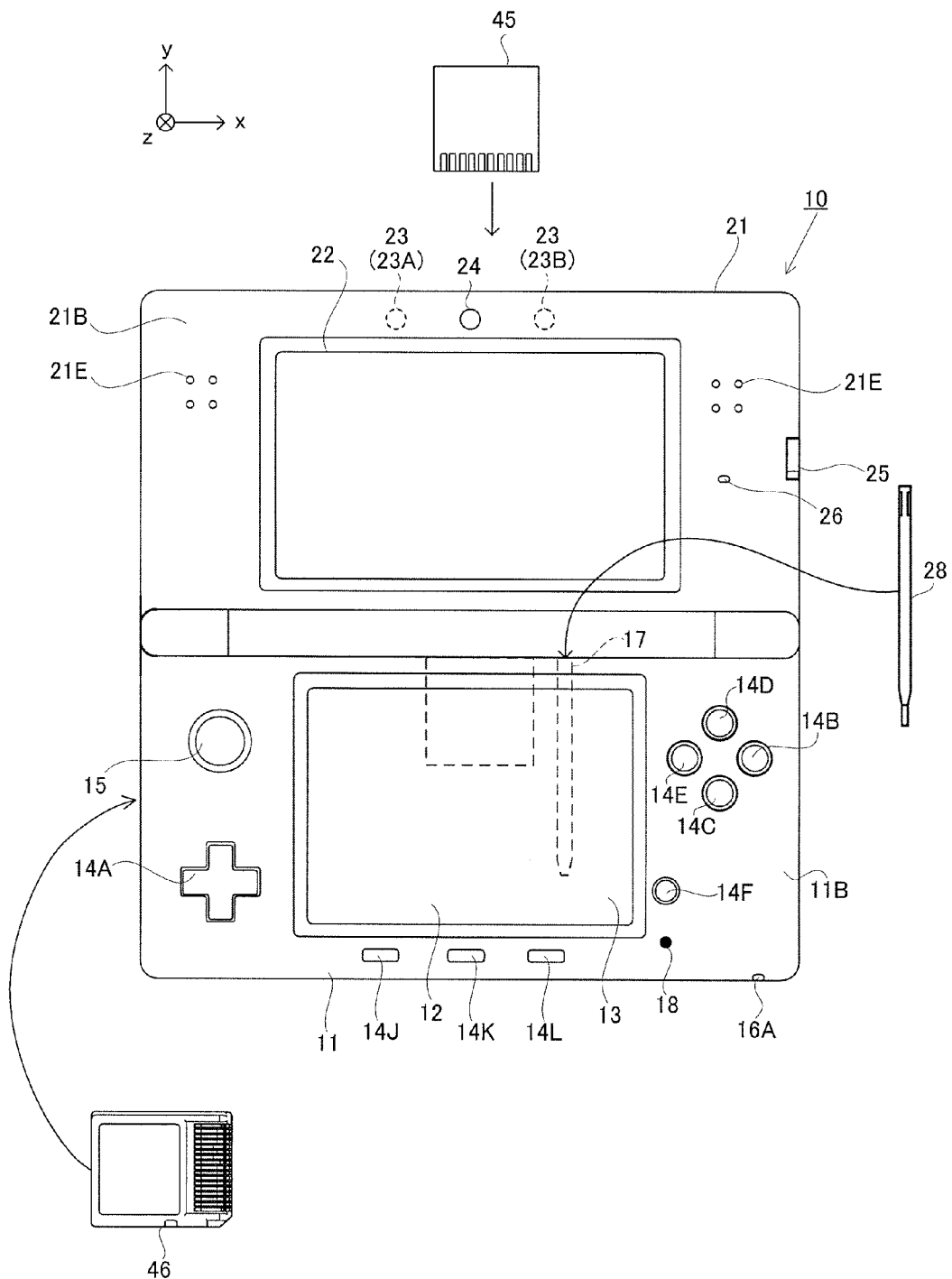
FIG. 1 is a front view of a game apparatus 10 in an open state.
Figure 2:
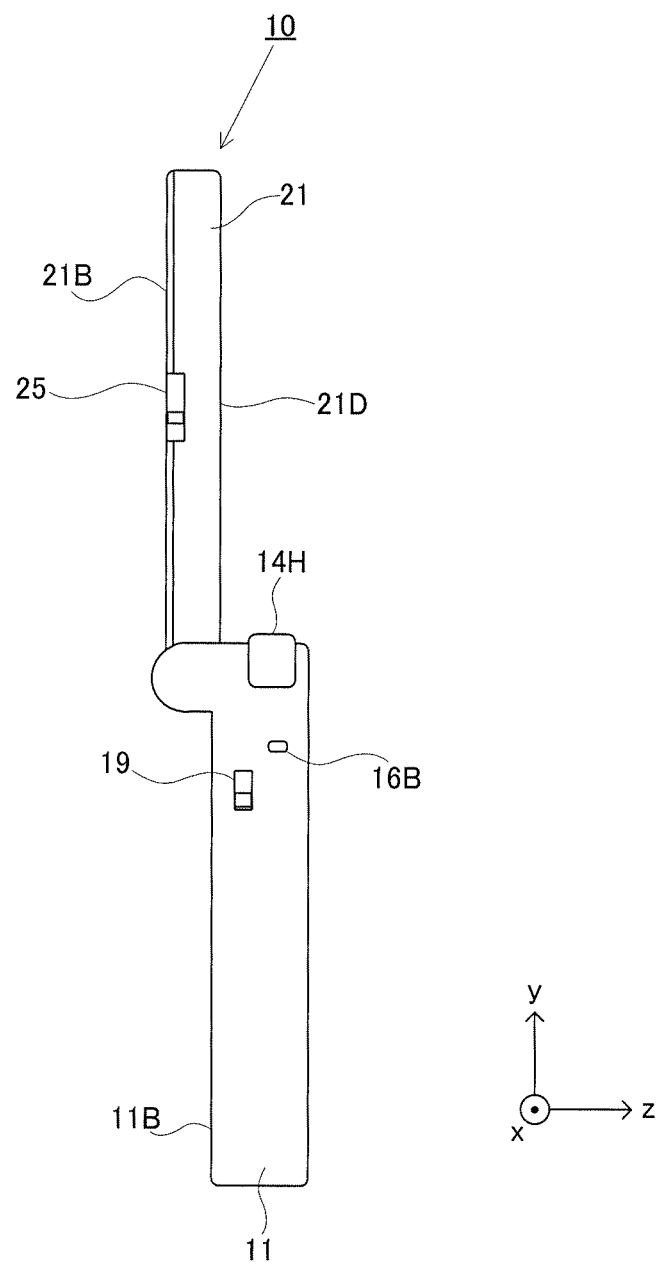
FIG. 2 is a right side view of the game apparatus 10 in the open state.
Figure 3:
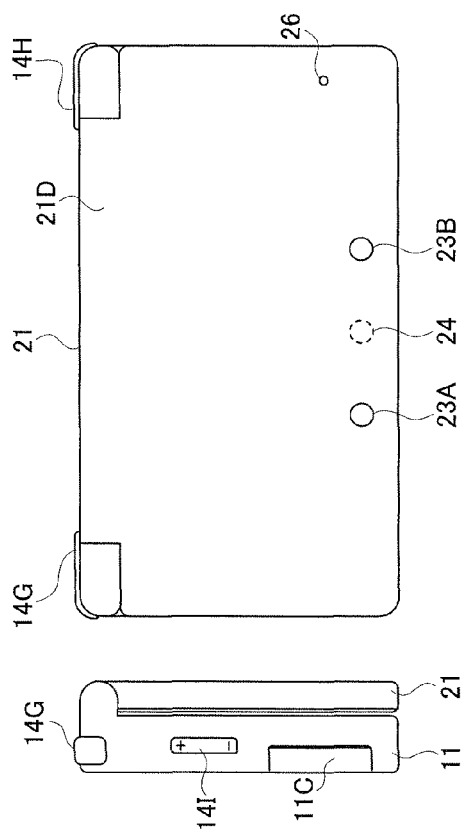
FIG. 3A is a left side view of the game apparatus 10 in a closed state.
FIG. 3B is a front view of the game apparatus 10 in the closed state.
FIG. 3C is a right side view of the game apparatus 10 in the closed state.
FIG. 3D is a rear view of the game apparatus 10 in the closed state.

FIG. 1 is a front view of the game apparatus 10 in an open state. FIG. 2 is a right side view of the game apparatus 10 in the open state. FIG. 3A is a left side view of the game apparatus 10 in a closed state. FIG. 3B is a front view of the game apparatus 10 in the closed state. FIG. 3C is a right side view of the game apparatus 10 in the closed state. FIG. 3D is a rear view of the game apparatus 10 in the closed state.

The game apparatus 10 is capable of executing a program stored in an exchangeable memory card (an external memory 45), or a program received from a server or another game apparatus. Further, the game apparatus 10 includes a capturing section that captures an image, and is also capable of displaying and storing the captured image (hereinafter referred to as a "camera image"). It should be noted that in the following descriptions, the act of acquiring a camera image in real time with the capturing section is termed "capturing", and the act of acquiring and storing a camera image with the capturing section in accordance with an instruction from a user is termed "photographing".

The game apparatus 10 includes a lower housing 11 and an upper housing 21. The upper housing 21 is joined to the lower housing 11 so as to be openable and closable. This makes the game apparatus 10 foldable. The game apparatus 10 is used in an open state (see FIGS. 1 and 2), and is stored away in a closed state (see FIGS. 3A through 3D) when not used.

[Configuration of Lower Housing 11]

As shown in FIGS. 1 through 3D, the lower housing 11 includes a lower liquid crystal display (LCD) 12, a touch panel 13, operation buttons 14 (14A through 14L), an analog stick 15, LEDs 16A and 16B, an accommodation section 17, a microphone hole 18, and a wireless switch 19.

The lower LCD 12 includes a wider-than-high display screen that displays an image in a planar manner, and is provided at the center of an inner surface 11B of the lower housing 11. The number of pixels of the lower LCD 12 is 256 dots×192 dots (horizontal×vertical). Alternatively, another resolution may be used. It should be noted that the lower LCD 12 is not limited to an LCD, and may be another display device such as one using electroluminescence (EL).

The touch panel 13 is provided so as to cover the display screen of the lower LCD 12, and functions as coordinate input means. In the present embodiment, the touch panel 13 is a resistive touch panel. Alternatively, the touch panel may also be a touch panel of another type such as an electrostatic capacitance type.

In the accommodation section 17 (a dashed line shown in FIGS. 1 and 3D), a touch pen 28 that is used to perform an operation on the touch panel 13 is accommodated through the upper surface of the lower housing 11. It should be noted that an input may be provided on the touch panel 13 also by, for example, a finger of the user.

As shown in FIG. 1, the cross button 14A, the button 14B, the button 14C, the button 14D, the button 14E, the power button 14F, the select button 14J, the home button 14K, and the start button 14L are provided on the inner surface 11B of the lower housing 11. Further, as shown in FIGS. 3B and 3D, the L button 14G is provided at the left end portion of the upper surface of the lower housing 11, and the R button 14H is provided at the right end portion of the upper surface of the lower housing 11. Furthermore, as shown in FIG. 3A, the sound volume button 14I is provided on the left side surface of the lower housing 11. The buttons 14A through 14L are appropriately assigned functions, respectively, in accordance with the program executed by the game apparatus 10. For example, the cross button 14A is used for a selection operation and the like. For example, the L button 14G and the R button 14H are used to instruct the capturing section to capture an image.

The analog stick 15 (see FIG. 1) is a device for indicating a direction. The analog stick 15 and the cross button 14A are placed so as to be operated by the thumb of a left hand of a user holding the lower housing 11. The key top of the analog stick 15 is configured to slide parallel to the inner surface 11B of the lower housing 11, and functions in accordance with the program executed by the game apparatus 10.

The microphone hole 18 is provided on the inner surface of the lower housing 11. Underneath the microphone hole 18, a microphone 43 described later (see FIG. 4) is provided, and detects sound received through the microphone hole 18.

As shown in FIG. 3A, a cover section 11C is provided on the left side surface of the lower housing 11 so as to be openable and closable. Within the cover section 11C, a connector (not shown) is provided for attaching a data storage external memory 46 (see FIG. 1) to the game apparatus 10 in a detachable manner. While connected to the connector, the data storage external memory 46 (an example of a memory) records (stores), for example, a camera image captured by the game apparatus 10.

As shown in FIG. 3D, on the upper surface of the lower housing 11, an insertion slot 11D is provided. Within the insertion slot 11D, a connector (not shown) is provided for connecting the external memory 45, as a storage medium having stored thereon the image generation program or the like (see FIG. 1), to the game apparatus 10 in a detachable manner. The image generation program is loaded into the game apparatus 10 by connecting the external memory 45 to the connector.

As shown in FIG. 1, on the lower surface of the lower housing 11, the first LED 16A is provided. The first LED 16A notifies the user of the on/off state of the power supply of the game apparatus 10. As shown in FIG. 3C, on the right side surface of the lower housing 11, the second LED 16B is provided. The game apparatus 10 is configured to wirelessly communicate with other devices. The second LED 16B notifies the user of the establishment state of the wireless communication of the game apparatus 10. The game apparatus 10 has the function of establishing connection with a wireless LAN. The operation on the wireless switch 19 provided near the second LED 16B enables/disables the function of the wireless communication.

[Configuration of Upper Housing 21]

The upper housing 21 includes an upper LCD 22 (an example of display means), an outer capturing section 23, an inner capturing section 24, a 3D adjustment switch 25, and a 3D indicator 26.

As shown in FIG. 1, the upper LCD 22 is provided on an inner surface 21B that opposes the inner surface 11B when the game apparatus 10 is folded. The upper LCD 22 includes a wider-than-high display screen, and is provided at the center of the inner surface 21B. The number of pixels of the upper LCD 22 is 640 dots×200 dots (horizontal×vertical) in the present embodiment. Alternatively, another resolution may be used. It should be noted that the upper LCD 22 is not limited to an LCD, and may be another display device such as one using EL.

The upper LCD 22 is a display device that displays a stereoscopically visible image (stereoscopic image). The upper LCD 22 displays a left-eye image and a right-eye image, using substantially the same display region. Specifically, the upper LCD 22 displays the left-eye image and the right-eye image alternately in the horizontal direction in predetermined units (e.g., in every other line). It should be noted that the upper LCD 22 may be a display device that displays the left-eye image and the right-eye image alternately for a predetermined time. Further, the upper LCD 22 is a display device that displays an image stereoscopically visible with the naked eye. In this case, a lenticular type display device or a parallax barrier type display device is used so that the left-eye image and the right-eye image that are displayed alternately in the horizontal direction can be viewed separately with the left eye and the right eye, respectively. In the present embodiment, the upper LCD 22 is of a parallax barrier type. The upper LCD 22 functions as a display device that allows the user to view the left-eye image with their left eye, and the right-eye image with their right eye, using the parallax barrier. This makes it possible to display a stereoscopic image giving the user a stereoscopic effect (a stereoscopically visible image). It should be noted that the upper LCD 22 is capable of disabling the parallax barrier, and therefore is capable of displaying an image in a planar manner.

As shown in FIGS. 1 and 2, the 3D adjustment switch 25 is provided at the portion where the inner surface 11B and the right side surface of the upper housing 21 intersect each other. The 3D adjustment switch 25 includes a slider that is slidable, for example, in the up-down direction. When the slider is placed at the lowermost position, the parallax barrier of the upper LCD 22 is disabled, and an image is displayed on the upper LCD 22 in a planar manner. On the other hand, when the slider is placed above the lowermost position, an image is displayed on the upper LCD 22 in a stereoscopic manner. The amount of deviation in the horizontal direction between the position of the right-eye image and the position of the left-eye image is adjusted by changing the position of the slider, and the visibility of the stereoscopic image is adjusted.

As shown in FIG. 1, the 3D indicator 26 is provided on the inner surface 21B of the upper housing 21. The 3D indicator 26 indicates whether or not the upper LCD 22 is in the stereoscopic display mode. The 3D indicator 26 is an LED in the present embodiment, and is lit on when the upper LCD 22 is in the stereoscopic display mode (when the 3D adjustment switch 25 is placed above the lowermost position).

As shown in FIG. 3B, the outer capturing section 23 (an example of a first capturing section) is provided on an outer surface 21D of the upper housing 21 (the surface opposite to the inner surface 21B). The outer capturing section 23 includes a left outer capturing section 23A and a right outer capturing section 23B. The left outer capturing section 23A and the right outer capturing section 23B each include an imaging device (e.g., a CCD image sensor or a CMOS image sensor) having a predetermined common resolution, and a lens. The left outer capturing section 23A and the right outer capturing section 23B are provided such that when the user views the screen of the upper LCD 22 from the front thereof, the left outer capturing section 23A is placed to the left of the upper LCD 22, and the right outer capturing section 23B is placed to the right of the upper LCD 22, as shown in FIG. 1. It should be noted that the distance between the left outer capturing section 23A and the right outer capturing section 23B is set to correspond to the distance between both eyes of a person. Capturing directions 52 (see FIG. 2) of the left outer capturing section 23a and the right outer capturing section 23b are each the same as the outward normal direction of the outer surface 21D, and are parallel to each other.

The left outer capturing section 23a and the right outer capturing section 23b can be used as a stereo camera, depending on the program executed by the game apparatus 10. When the outer capturing section 23 is used as a stereo camera, the left outer capturing section 23A captures a camera image to be viewed with the user's left eye (a left-eye image), and the right outer capturing section 23b captures a camera image to be viewed with the user's right eye (a right-eye image). This makes it possible to display a camera image captured by the outer capturing section 23 on the upper LCD 22 in a stereoscopic manner. Alternatively, either one of the left outer capturing section 23A and the right outer capturing section 23B may be used solely, so that the outer capturing section 23 can also be used as a non-stereo camera, depending on the program.

The inner capturing section 24 (an example of a capturing section) is provided on the inner surface 21B of the upper housing 21. The inner capturing section 24 includes an imaging device (e.g., a CCD image sensor or a CMOS image sensor) having a predetermined resolution, and a lens. The inner capturing section 24 is a capturing section that captures an image in the direction opposite to that of the outer capturing section 23.

Speaker holes 21E are provided on the inner surface 21B of the upper housing 21. Sound from the loudspeaker 44 described later (see FIG. 4) is output through the speaker holes 21E.

[Internal Configuration of Game Apparatus 10]

Figure 4:
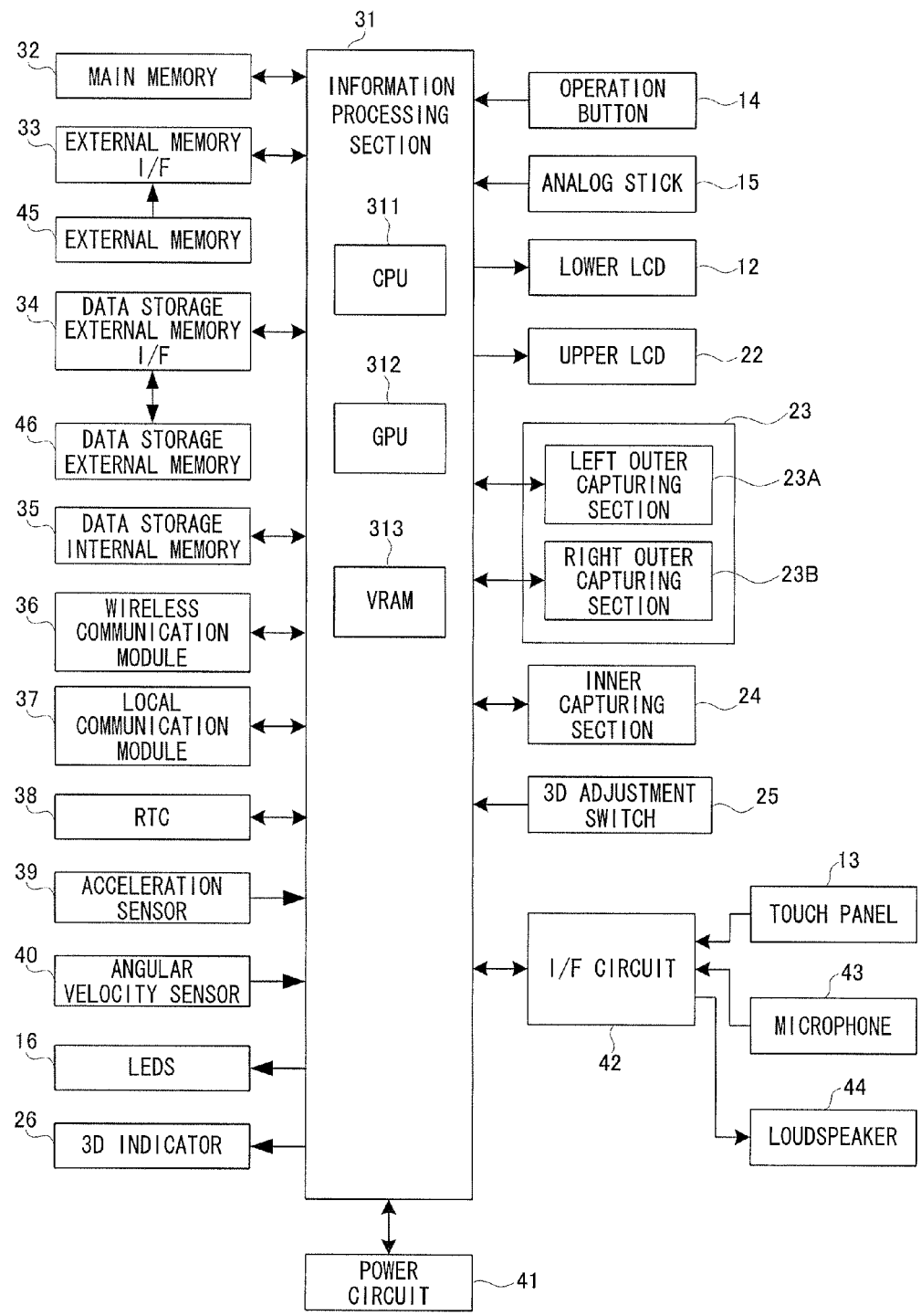
FIG. 4 is a non-limiting exemplary block diagram showing an example of the internal configuration of the game apparatus 10.

Next, with reference to FIG. 4, a description is given of the internal configuration of the game apparatus 10. Here, FIG. 4 is a non-limiting exemplary block diagram showing an example of the internal configuration of the game apparatus 10.

As shown in FIG. 4, the game apparatus 10 includes electronic components, such as an information processing section 31, a main memory 32, an external memory I/F 33, a data storage external memory I/F 34, a data storage internal memory 35, a wireless communication module 36, a local communication module 37, a real-time clock (RTC) 38, an acceleration sensor 39, an angular velocity sensor 40, a power circuit 41, and an I/F circuit 42. These electronic components are mounted on electronic circuit boards, and are accommodated in the lower housing 11 (or in the upper housing 21).

The information processing section 31 is information processing means including a central processing unit (CPU) 311, a graphics processing unit (GPU) 312, and a video RAM (VRAM) 313. In the present embodiment, the image generation program is stored in the external memory 45, and the CPU 311 loads the image generation program from the external memory 45, and executes the image generation program. It should be noted that the image generation program may be acquired from another device by communication with said another device.

The GPU 312 draws an image in the VRAM 313 in accordance with an instruction from the CPU 311, and outputs the image to the upper LCD 22 and/or the lower LCD 12. Consequently, the image is displayed on the upper LCD 22 and/or the lower LCD 12.

The main memory 32 is volatile storage means (e.g., a pseudo SRAM (PSRAM)) used as a work area or a buffer area of the information processing section 31 (the CPU 311). The main memory 32 temporarily stores various types of data used for the processing performed by the information processing section 31, and also temporarily stores a program acquired from outside (the external memory 45, another device, or the like) the game apparatus 10.

The external memory I/F 33 is an interface for establishing a detachable connection with the external memory 45. The external memory 45 is nonvolatile storage means for storing the program executed by the information processing section 31. The external memory 45 is composed of, for example, a read-only semiconductor memory. When the external memory 45 is connected to the external memory I/F 33, the information processing section 31 can load a program stored in the external memory 45, and is performed by the information processing section 31.

The data storage external memory I/F 34 is an interface for establishing a detachable connection with the data storage external memory 46. The data storage external memory 46 is composed of a readable/writable non-volatile memory (e.g., a NAND flash memory). The data storage external memory 46 stores, for example, images captured by the outer capturing section 23 or the inner capturing section 24. When the data storage external memory 46 is connected to the data storage external memory I/F 34, the information processing section 31 loads an image stored in the data storage external memory 46, and is capable of causing the image to be displayed on the upper LCD 22 and/or the lower LCD 12.

The data storage internal memory 35 is composed of a readable/writable non-volatile memory (e.g., a NAND flash memory). The data storage internal memory 35 stores, for example, data and/or programs downloaded by wireless communication through the wireless communication module 36.

The wireless communication module 36 has the function of establishing connection with a wireless LAN by, for example, a method based on the IEEE 802.11.b/g standard. The local communication module 37 has the function of wirelessly communicating with another game apparatus of the same type by a predetermined communication method (e.g., infrared communication). The CPU 311 is capable of transmitting and receiving data to and from another device via the Internet, using the wireless communication module 36, and is capable of transmitting and receiving data to and from another game apparatus of the same type, using the local communication module 37.

The acceleration sensor 39 detects the magnitudes of the accelerations in the directions of straight lines (linear accelerations) along three axial (x, y, and z axes in the present embodiment) directions, respectively. The angular velocity sensor 40 detects the angular velocities generated about three axes (x, y, and z axes in the present embodiment) of the game apparatus 10, respectively. The CPU 311 can calculate the orientation and the motion of the game apparatus 10 on the basis of data indicating the accelerations detected by the acceleration sensor 39 and data indicating the angular velocities detected by the angular velocity sensor 40.

The RTC 38 counts time, and outputs the counted time to the information processing section 31. The information processing section 31 calculates the current time (date) on the basis of the time counted by the RTC 38. The power circuit 41 supplies power to each component of the game apparatus 10 from the power supply (e.g., the rechargeable battery accommodated in the lower housing 11) of the game apparatus 10.

A microphone 43, a loudspeaker 44, and the touch panel 13 are connected to the I/F circuit 42. The microphone 43 detects sound from the user, and outputs a sound signal to the I/F circuit 42. Specifically, the loudspeaker 44 is connected to the I/F circuit 42 through an amplifier not shown in the figures. The loudspeaker 44 outputs sound corresponding to the sound signal received from the I/F circuit 42 via the amplifier not shown in the figures. The I/F circuit 42 includes a sound control circuit that controls the microphone 43 and the loudspeaker 44 (amplifier). The sound control circuit performs A/D conversion and D/A conversion on the sound signal, and converts the sound signal into sound data in a predetermined format. The I/F circuit 42 also includes a touch panel control circuit that controls the touch panel 13. The touch panel control circuit generates touch position data in a predetermined format on the basis of a signal from the touch panel 13, and outputs the touch position data to the information processing section 31. The touch position data indicates the coordinates of the position (touch position) at which an input has been provided on the input surface of the touch panel 13. It should be noted that the touch panel control circuit reads a signal from the touch panel 13, and generates the touch position data, once in a predetermined time. The CPU 311 acquires the touch position data, and thereby recognizes the touch position, at which the input has been provided on the touch panel 13.

Operation data is output to the information processing section 31, the operation data indicating the states of the operations of the respective operation buttons 14A through 14L. The CPU 311 of the information processing section 31 determines the presence or absence of the operation of each of the operation buttons 14A through 14L on the basis of the operation data, and performs predetermined processes corresponding to the operated operation buttons 14.

The lower LCD 12 and the upper LCD 22 each display an image in accordance with an instruction from the information processing section 31 (the GPU 312). The information processing section 31 causes a stereoscopic image (stereoscopically visible image) using a left-eye image and a right-eye image to be displayed on the upper LCD 22, the images captured by the outer capturing section 23, for example.

The 3D adjustment switch 25 outputs an electrical signal corresponding to the position of the slider to the information processing section 31. In response to this, the information processing section 31 (the CPU 311) sets the display mode of the upper LCD 22 on the basis of the electrical signal from the 3D adjustment switch 25. Further, the information processing section 31 controls whether or not the 3D indicator 26 is to be lit on.

It should be noted that the hardware configuration described above is provided merely for illustrative purposes, and the configuration of the game apparatus 10 can be appropriately changed.

[Display Screens of Upper LCD 22 and Lower LCD 12]

In the game apparatus 10 according to the present embodiment, when photographing has been performed using the outer capturing section 23, a randomly selected type of image processing is performed on a camera image obtained by the photographing (corresponding to a first captured image, and hereinafter referred to as an "outer camera image"). At this time, there is a case where a type of image processing is selected that uses: a face image representing a face included in the outer camera image obtained by the photographing; and a face image representing a face included in a camera image obtained by photographing performed in the past and stored in the data storage external memory 46 (corresponding to a second captured image, and hereinafter referred to as a "saved image"). As a result, it is possible to obtain a very interesting strange image (see FIGS. 7 through 9, 11 through 13, and 15). Here, the strange image is an image obtained by performing a type of image processing using face images on a camera image acquired in real time by a capturing section (here, the outer camera image).

Figure 5:
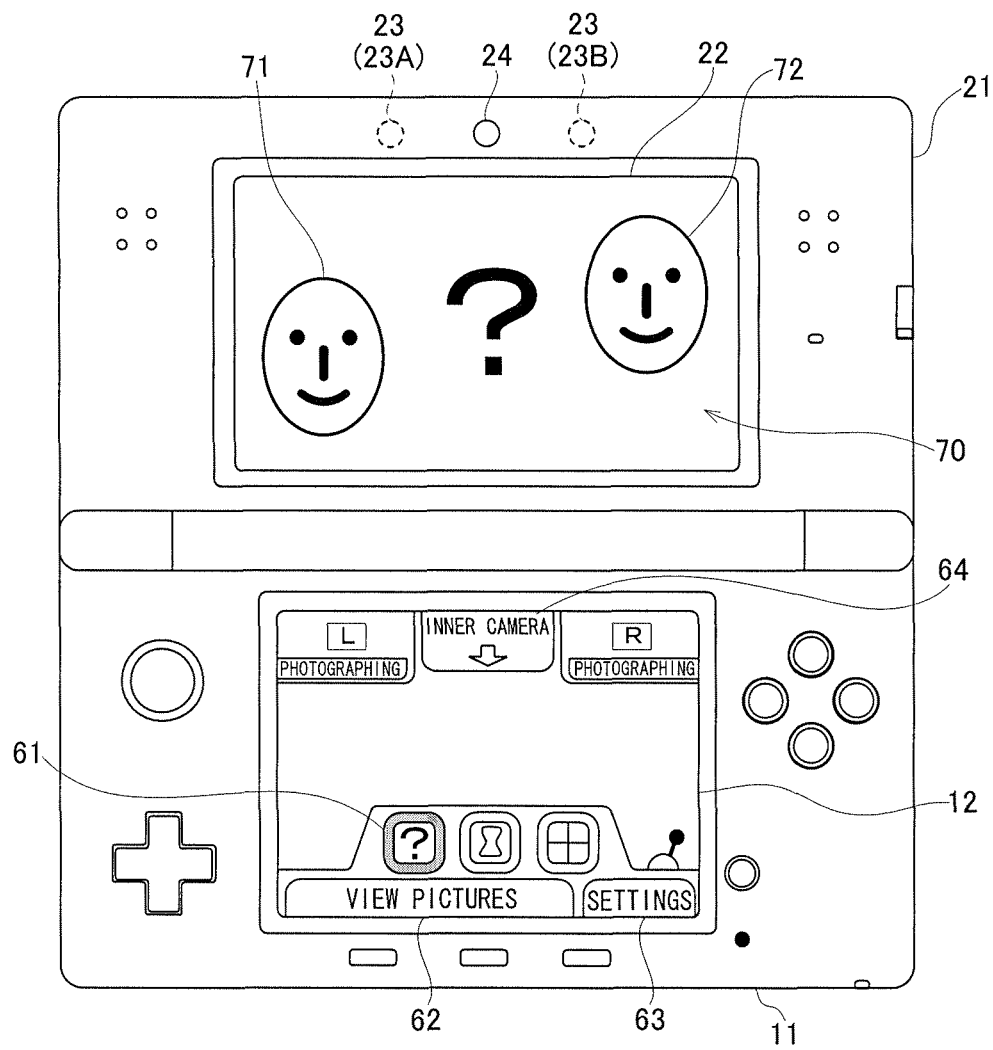
FIG. 5 is a front view of the game apparatus 10 showing an example of display of an upper LCD 22 and a lower LCD 12.

With reference to FIG. 5, a description is given below of images displayed on the upper LCD 22 and the lower LCD 12 when photographing for obtaining strange images 91 through 97 is performed. FIG. 5 is a front view of the game apparatus 10 showing an example of display of the upper LCD 22 and the lower LCD 12. When the game apparatus 10 has made a transition to a photographing mode where the strange images 91 through 97 can be obtained, an operation screen including buttons 61 through 64 is displayed on the lower LCD 12 as shown in FIG. 5. The buttons 61 through 64 are images associated with predetermined processes, respectively. The user can cause the information processing section 31 to perform the predetermined processes by arbitrarily selecting the buttons 61 through 64 displayed on the lower LCD 12. When the touch panel 13 has been touched by the touch pen 28, the button placed at the touch position (the button 61 in FIG. 5) is highlighted (e.g., by contour enhancement). Then, when the touch pen 28 placed on the button has been separated from the touch panel 13, the highlight of the button is canceled, and the process corresponding to the button is performed.

The button 61 is a button for causing the game apparatus 10 to make a transition to the state where photographing for obtaining a strange image can be performed. When the button 61 has been selected, a substitute image 70 described later is displayed on the upper LCD 22 (see FIG. 5).

The button 62 is a button for browsing images obtained by photographing performed by the game apparatus 10. When the button 62 has been selected, thumbnail images of images stored in, for example, the data storage external memory 46 are displayed as a list on the lower LCD 12. The user can select a desired thumbnail image in this state, and thereby can cause the saved image corresponding to the thumbnail image to be displayed on the upper LCD 22. The button 63 is a button for giving an instruction to change various settings concerning photographing. The button 64 is a button for giving an instruction to switch the capturing section to be used for photographing. The user can operate the button 64, and thereby can switch the capturing section to be used for photographing to the outer capturing section 23 or the inner capturing section 24.

Before an instruction is given on photographing, the substitute image 70 is displayed on the upper LCD 22 instead of the outer camera image acquired in real time by the outer capturing section 23. In another photographing mode, the substitute image 70 functions as a blind for hiding the outer camera image displayed on the upper LCD 22. As described above, in the photographing mode for obtaining a strange image, the outer camera image is hidden. This prevents the user of the game apparatus 10 from easily predicting, from the outer camera image acquired in real time by the outer capturing section 23, the content of the type of image processing to be performed on the outer camera image.

Incidentally, there is a case where a face image is used for a type of image processing for obtaining a strange image. Accordingly, a face image representing a face needs to be included in the outer camera image obtained by photographing performed by the outer capturing section 23, or a face image representing a face needs to be included in the saved image. That is, the user of the game apparatus 10 cannot acquire a strange image obtained as a result of a type of image processing using a face image included in the outer camera image, if the user does not perform photographing so as to include a person's face as a subject.

In response, in the present embodiment, when peoples' faces are included in the capturing range of the outer capturing section 23, the substitute image 70 including marker images 71 and 72 that imply the positions of the peoples' faces is displayed on the upper LCD 22. Specifically, a face recognition process is performed on the outer camera image acquired in real time by the outer capturing section 23. When recognition of peoples' faces has been successful, the positions and the number of the peoples' faces are specified, and the substitute image 70 including marker images is displayed on the upper LCD 22. Here, the faces of two people are included in the capturing range of the outer capturing section 23, and therefore, the substitute image 70 including the two marker images 71 and 72 is displayed on the upper LCD 22. As described above, the display of the substitute image 70 including marker images on the upper LCD 22 enables the user of the game apparatus 10 to easily understand whether or not faces are included in the capturing range of the outer capturing section 23, or the number of the faces included in the capturing range, even if the outer camera image is not displayed on the upper LCD 22.

[Overview of Image Processing for Obtaining Strange Image]

Figure 6:
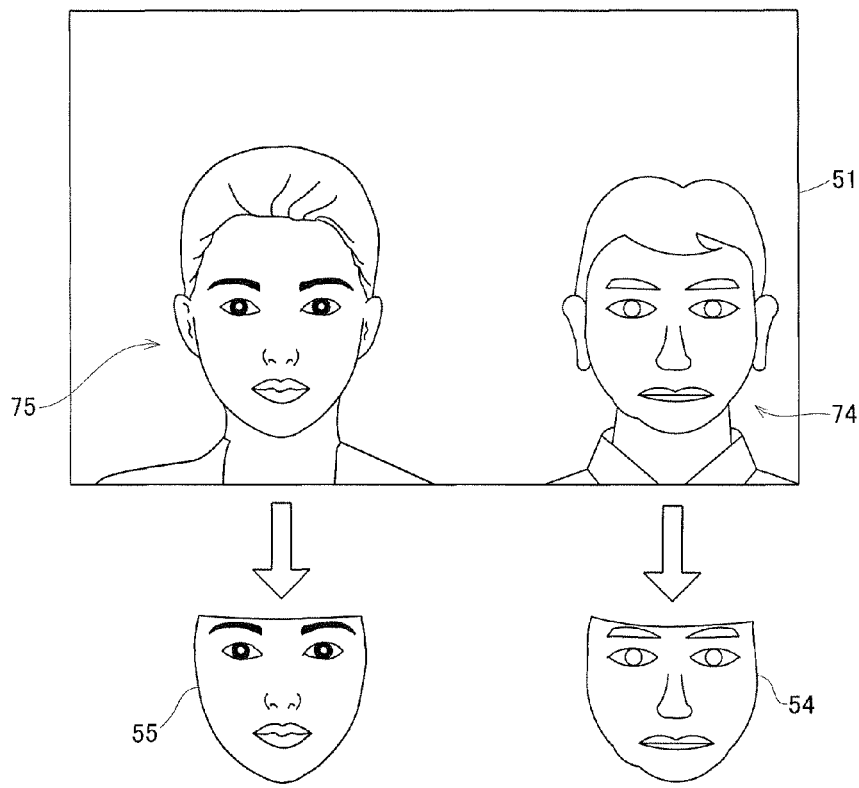
FIG. 6 is a non-limiting exemplary diagram illustrating a process of acquiring face images 54 and 55 from an outer camera image 51.

With reference to FIGS. 6 through 15, a description is given below of types of image processing using face images. Here, FIG. 6 is a non-limiting exemplary diagram illustrating a process of acquiring face images 54 and 55 from an outer camera image 51 obtained by photographing.

When two people 74 and 75 are included in the capturing range of the outer capturing section 23, it is possible to acquire the outer camera image 51 as exemplified in FIG. 6 by performing photographing with the outer capturing section 23. The game apparatus 10 performs the face recognition process on the outer camera image 51 thus acquired. Consequently, the areas indicating the faces of the people 74 and 75 (face areas 81 and 82 in FIG. 20) are specified, and the face images 54 and 55 representing the faces of the people 74 and 75 are acquired from the outer camera image. As described above, when face images (here, the face images 54 and 55) can be acquired from the outer camera image 51, it is possible to perform a type of image processing using the face images on the outer camera image obtained by the photographing.

Figure 7:
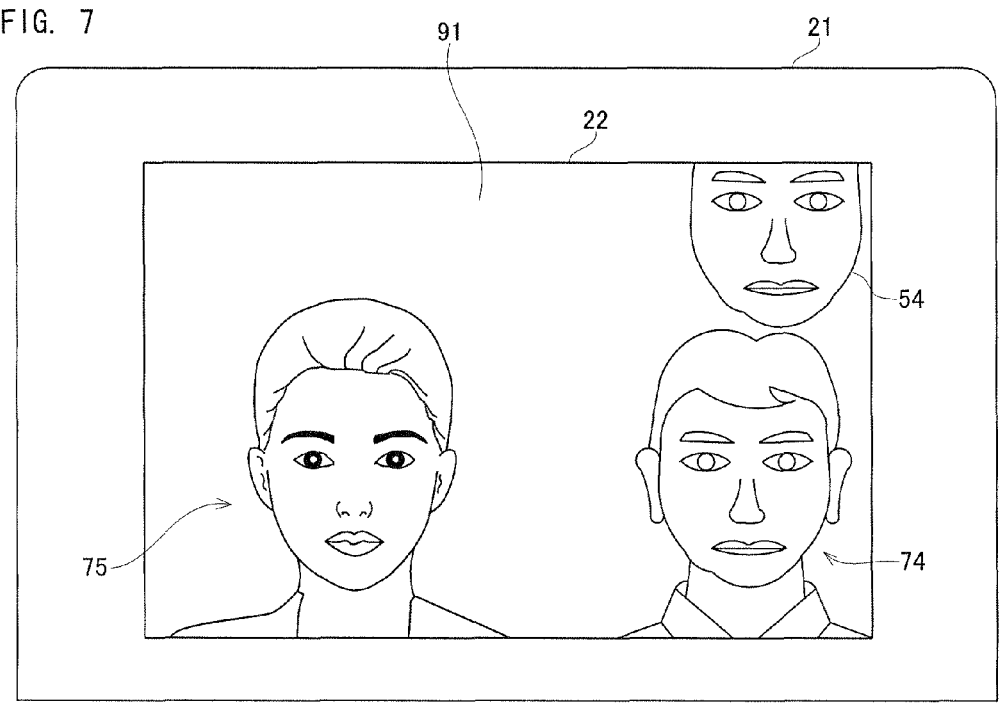
FIG. 7 is a screen view of the upper LCD 22 showing a strange image 91 representing the rising of the face of a person 74.
Figure 8:
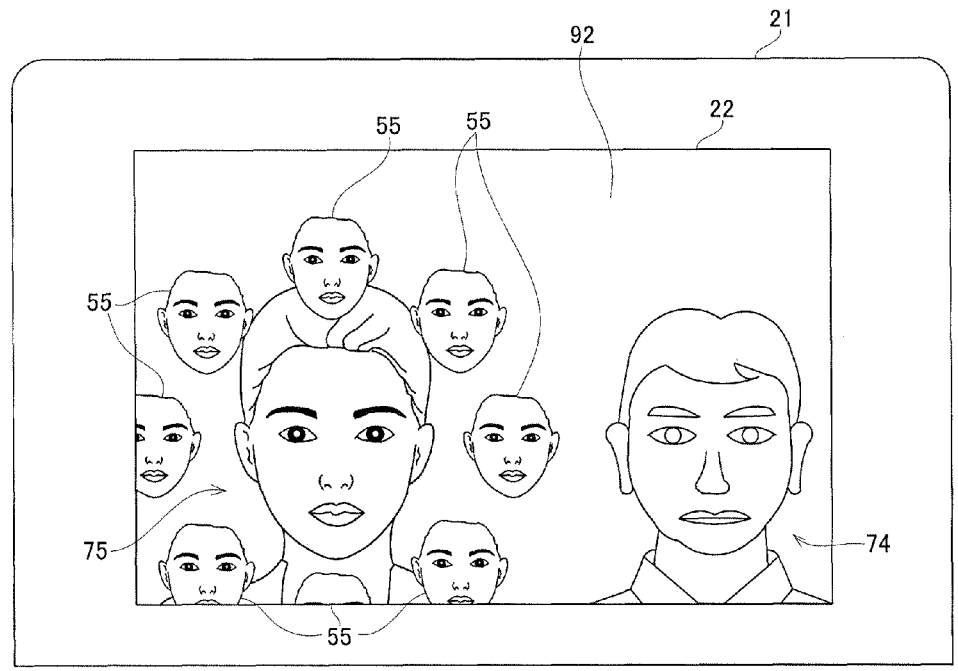
FIG. 8 is a screen view of the upper LCD 22 showing a strange image 92 obtained by placing the face of the person 75 in a mandala manner.
Figure 9:
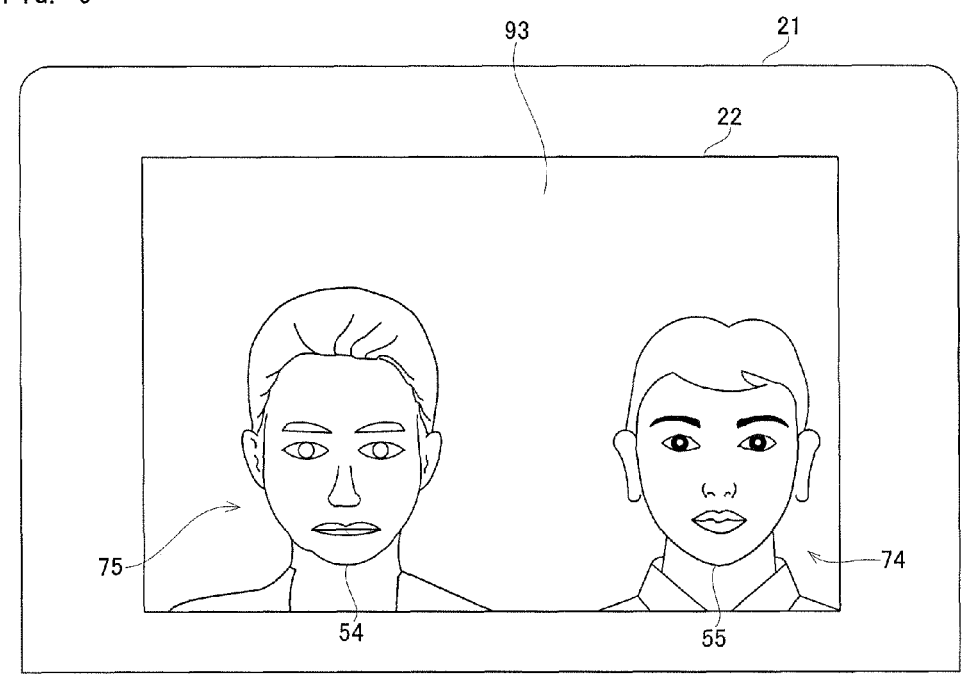
FIG. 9 is a screen view of the upper LCD 22 showing a strange image 93 obtained by replacing the face of the person 74 and the face of the person 75 with each other.

Next, with reference to FIGS. 7 through 9, a description is given of types of image processing using the face image 54 or the face image 55. Here, FIG. 7 is a screen view of the upper LCD 22 showing the strange image 91 representing the rising of the face of the person 74. FIG. 8 is a screen view of the upper LCD 22 showing the strange image 92 obtained by placing copies of the face of the person 75 in a mandala manner. FIG. 9 is a screen view of the upper LCD 22 showing the strange image 93 obtained by replacing the face of the person 74 and the face of the person 75 with each other. It should be noted that in the screen views of the upper LCD 22 in FIG. 7 and thereafter, the backgrounds of the people 74 and 75 are not shown.

As shown in FIG. 7, there is a case where, when the face images 54 and 55 are included in the outer camera image 51 obtained by photographing performed by the outer capturing section 23, a type of image processing using the face image 54 is selected. In this case, the face image 54 of the person 74 is acquired by performing the face recognition process on the outer camera image 51. Then, the strange image 91 is obtained by performing a type of image processing of combining the face image 54 with the outer camera image 51 such that the face represented by the face image 54 is placed above the face of the person 74 in the outer camera image 51. It should be noted that the strange image 91 represents an out-of-body experience of the person 74. It should be noted that it is possible to perform a type of image processing for obtaining the strange image 91 if at least one face image is included in the outer camera image. Further, as a matter of course, it is also possible to obtain a strange image similar to the strange image 91 using the face image 55.

As shown in FIG. 8, there is a case where, when the face images 54 and 55 of the people 74 and 75 are included in the outer camera image 51 obtained by photographing performed by the outer capturing section 23, a type of image processing using the face image 55 is selected. In this case, the face image 55 of the person 75 is acquired by performing the face recognition process on the outer camera image 51. Then, the strange image 92 is obtained by performing a type of image processing of combining face images 55 with the outer camera image 51 such that the faces represented by the face images 55 are placed in eight directions from the face of the person 75 in the outer camera image 51. It should be noted that the strange image 92 represents the person 75 as a mandala. It should be noted that it is possible to perform a type of image processing for obtaining the strange image 92 if at least one face image is included in the outer camera image. Further, as a matter of course, it is also possible to obtain a strange image similar to the strange image 92 using the face image 54.

As shown in FIG. 9, there is a case where, when the face images 54 and 55 of the people 74 and 75 are included in the outer camera image 51 obtained by photographing performed by the outer capturing section 23, a type of image processing using the face image 54 and the face image 55 is selected. In this case, the two face images 54 and 55 are acquired by performing the face recognition process on the outer camera image 51. Then, the strange image 93 is obtained by performing a type of image processing of combining the face images 54 and 55 with the outer camera image 51 such that the face image 54 overlaps the face of the person 75, and the face image 55 overlaps the face of the person 74. It should be noted that the strange image 93 represents the replacement of the face of the person 74 and the face of the person 75 with each other. It should be noted that as a matter of course, it is also possible to obtain a strange image similar to the strange image 93 when three or more face images are included in the outer camera image.

Figure 10:
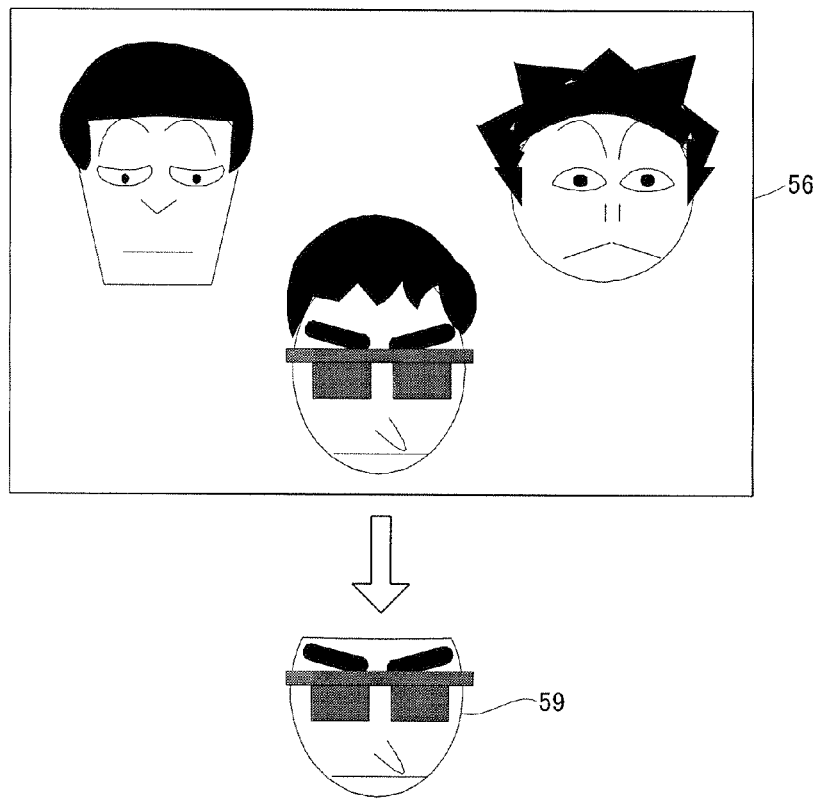
FIG. 10 is a non-limiting exemplary diagram illustrating a process of acquiring a face image 59 from a saved image 56.

Incidentally, the game apparatus 10 can perform not only a type of image processing using a face image acquired from an outer camera image obtained by the current photographing, but also a type of image processing using a face image acquired from a saved image that has been acquired by photographing performed the game apparatus 10 in the past and has been stored in the data storage external memory 46. FIG. 10 is a non-limiting exemplary diagram illustrating a process of acquiring a face image 59 from a saved image 56.

As shown in FIG. 10, when face images of three people are included in the saved image 56 stored in the data storage external memory 46, the game apparatus 10 performs the face recognition process on the saved image 56 in a similar manner to that performed on the outer camera image 51. Then, the area representing the face of any one of the three people is specified, and the face image 59 representing, for example, the face of the person in the middle is acquired. When a face image (here, the face image 59) can be acquired from the saved image 56, it is possible to perform a type of image processing using the face image on the outer camera image obtained by the current photographing.

Figure 11:
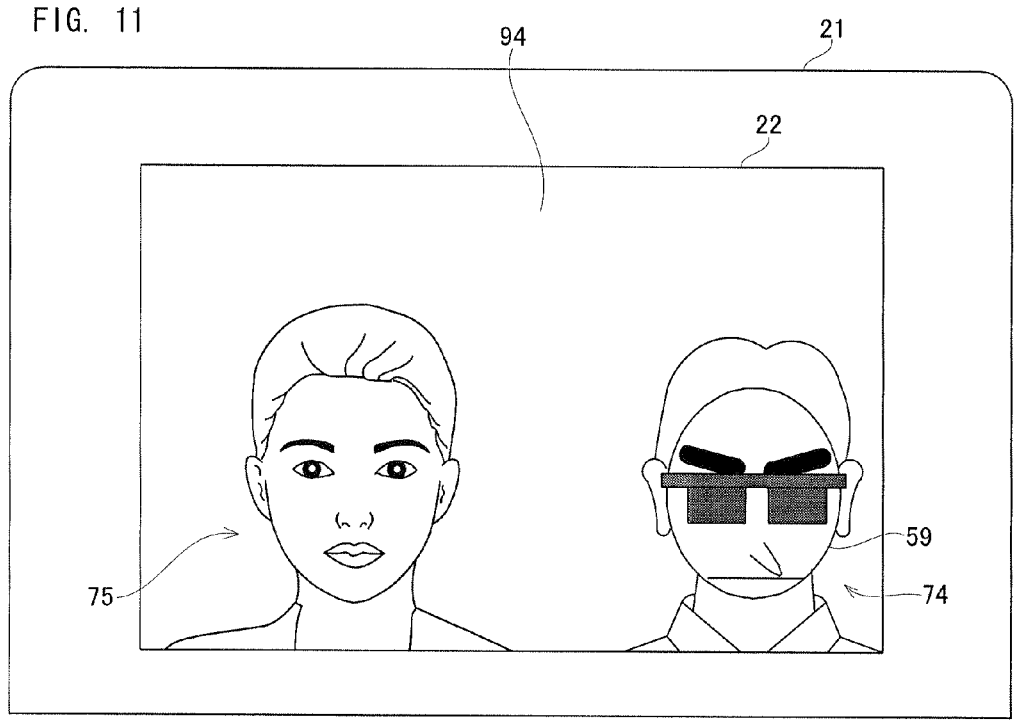
FIG. 11 is a screen view of the upper LCD 22 showing a strange image 94 obtained by replacing the face image 54 of the person 74 with the face image 59.

FIG. 11 is a screen view of the upper LCD 22 showing the strange image 94 obtained by replacing the face image 54 of the person 74 with the face image 59. As shown in FIG. 11, there is a case where, when the face image 59 is included in the saved image 56, a type of image processing using the face image 59 is selected. In this case, the face image 59 of the person in the middle shown in FIG. 10 is acquired by performing the face recognition process on the saved image 56. Then, the strange image 94 is obtained by performing a type of image processing of combining the face image 59 with the outer camera image 51 such that the face image 59 is superimposed on the face image 54 of the person 74. It should be noted that the strange image 94 represents the replacement of the face of the person 74 with the face of a different person who is not present around the game apparatus 10 when the photographing is performed. It should be noted that it is also possible to obtain a strange image in which the face image 59 is superimposed on the face of the person 75.

Figure 12:
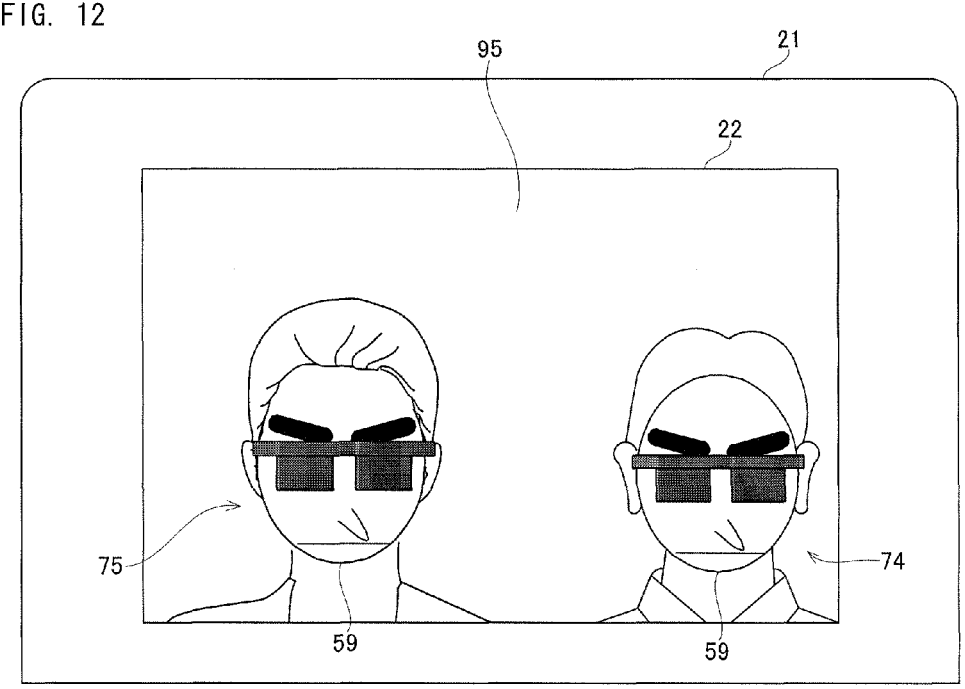
FIG. 12 is a screen view of the upper LCD 22 showing a strange image 95 obtained by replacing the face images 54 and 55 of the people 74 and 75 with the face image 59.

FIG. 12 is a screen view of the upper LCD 22 showing the strange image 95 obtained by replacing the face images 54 and 55 of the people 74 and 75 with the face image 59. As shown in FIG. 12, there is a case where, when the face image 59 is included in the saved image 56, a type of image processing using the face image 59 is selected. In this case, the face image 59 of the person in the middle shown in FIG. 10 is acquired by performing the face recognition process on the saved image 56. Then, the strange image 95 is obtained by performing a type of image processing of combining two face images 59 with the outer camera image 51 such that in the outer camera image 51, the face image 54 of the person 74 is replaced with one of the face images 59, and the face image 55 of the person 75 is replaced with the other face image 59. It should be noted that the strange image 95 represents the replacement of the faces of the people 74 and 75 with the face of a different person who is not present around the game apparatus 10 when the photographing is performed. It should be noted that as a variation of such a type of image processing for obtaining the face combination image 95, a type of image processing may be performed of replacing all the face images included in the outer camera image 51 with any one of the face images (e.g., the face image 54) included in the outer camera image 51. In this case, a strange image is obtained in which all the face images included in the outer camera image 51 are replaced with the face of any one person in front of the outer capturing section 23. This makes it possible to represent the state where a plurality of people photographed by the outer capturing section 23 appear as if they have become brothers.

Figure 13:
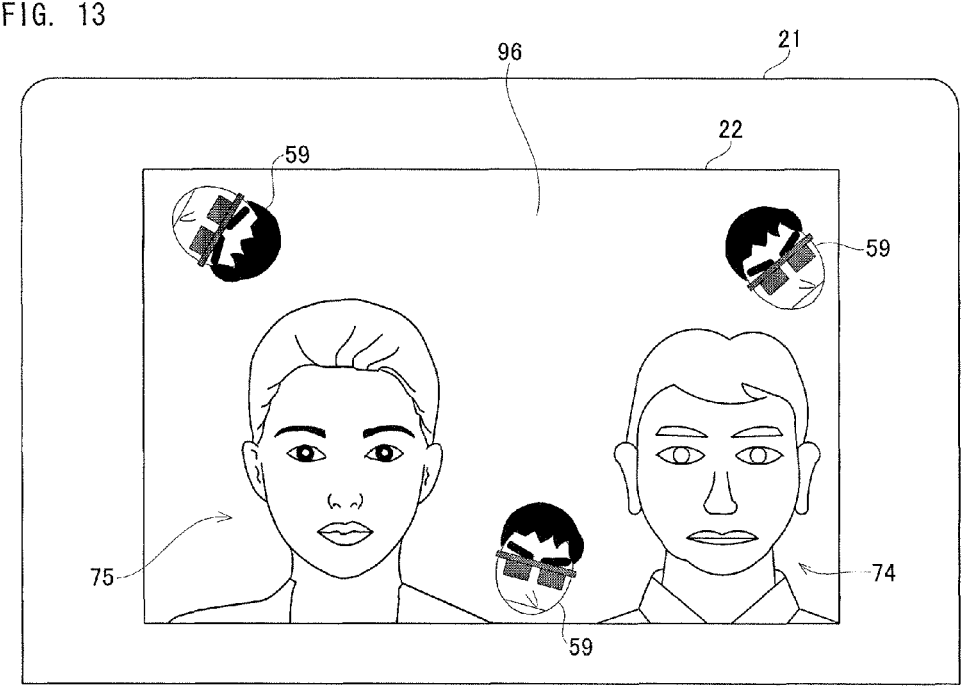
FIG. 13 is a screen view of the upper LCD 22 showing a strange image 96 obtained by inserting a plurality of face images 59 into the outer camera image 51.

FIG. 13 is a screen view of the upper LCD 22 showing the strange image 96 obtained by inserting a plurality of face images 59 into the outer camera image 51. There is a case where, when the face image 59 is included in the saved image 56 as shown in FIG. 10, a type of image processing using the face image 59 is selected. In this case, the face image 59 of the person in the middle shown in FIG. 10 is acquired by performing the face recognition process on the saved image 56. Then, the strange image 96 is obtained by performing a type of image processing of combining three face images 59 with the outer camera image 51 such that the three faces represented by the face images 59 are placed around the people 74 and 75 in the outer camera image 51. It should be noted that the strange image 96 represents the emergence, like a guardian spirit, around the faces of the people 74 and 75, of the face of a different person who is not present around the game apparatus 10 when the photographing is performed. It should be noted that to obtain such a strange image 96, a type of image processing may be performed of combining decorative images, such as black bar across the eyes, eyeglasses, and horns, with the face images acquired from the saved image, and subsequently, the face images subjected to the type of image processing may be combined with the outer camera image 51.

Figure 14:
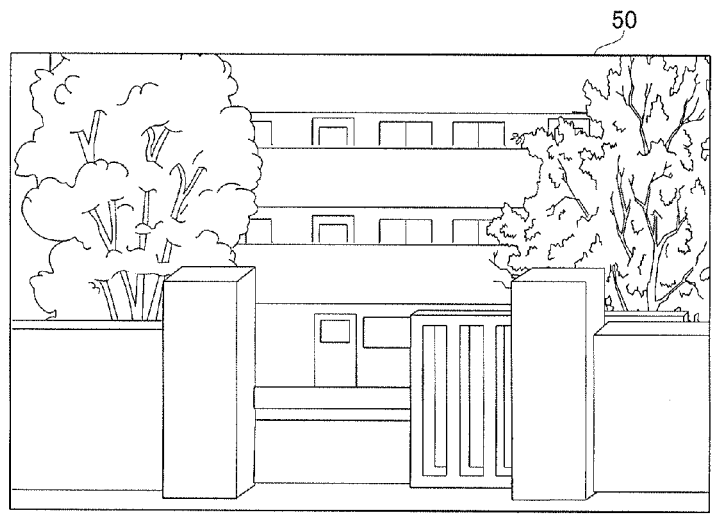
FIG. 14 is a non-limiting exemplary diagram showing an example of an outer camera image 50 obtained by photographing performed by the outer capturing section 23.
Figure 15:
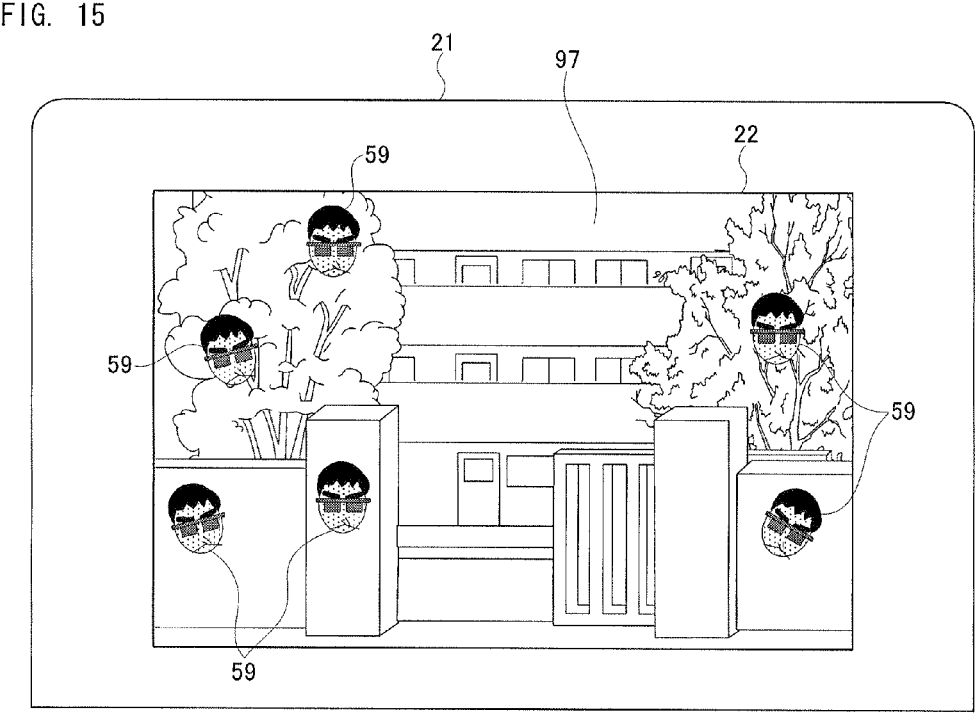
FIG. 15 is a screen view of the upper LCD 22 showing a strange image 97 obtained by inserting a plurality of face images 59 inserted into the outer camera image 50.

FIG. 14 is a non-limiting exemplary diagram showing an example of an outer camera image 50 obtained by photographing performed by the outer capturing section 23. FIG. 15 is a screen view of the upper LCD 22 showing the strange image 97 obtained by inserting a plurality of face images 59 into the outer camera image 50.

As shown in FIG. 14, even if the outer camera image 50 including no face image has been obtained by photographing, it is possible to perform a type of image processing using face images on the outer camera image 50 if a face image is included in a saved image. There is a case where, when the face image 59 is included in the saved image 56 as shown in FIG. 10, a type of image processing using the face image 59 is selected. In this case, the face image 59 of the person in the middle shown in FIG. 10 is acquired by performing the face recognition process on the saved image 56. Then, the strange image 97 is obtained by performing a type of image processing of combining six face images 59 with the outer camera image 50 such that the six face images represented by the face image 59 are placed in the outer camera image 50. It should be noted that the strange image 97 represents the emergence, in a restligeist manner around a building, of the face of a person who is not present around the game apparatus 10 when the photographing is performed.

As described above, the game apparatus 10 can obtain an interesting captured image by performing a type of image processing using a face image included in an outer camera image obtained by the current photographing, and a face image included in a saved image obtained by photographing performed in the past.

[Memory Map]

Figure 16:
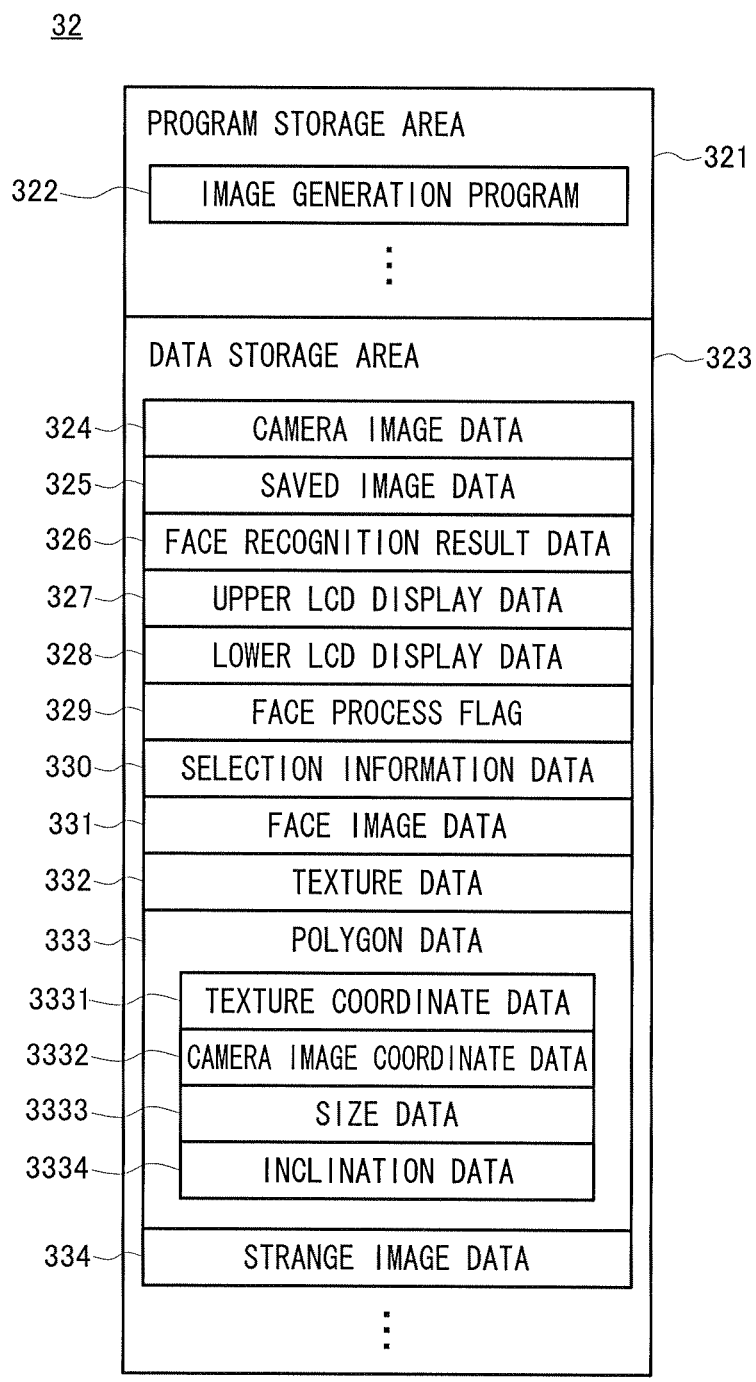
FIG. 16 is a non-limiting exemplary memory map of a main memory 32.

With reference to FIG. 16, a description is given below of data stored in the main memory 32. Here, FIG. 16 is a non-limiting exemplary memory map of the main memory 32. As exemplified in FIG. 16, the main memory 32 includes a program storage area 321 and a data storage area 323. In the program storage area 321, programs to be executed by the CPU 311 are stored. In the data storage area 323, various data is stored that is necessary for the types of processing for obtaining the strange images 91 through 97. The programs stored in the program storage area 321 and part of the data stored in the data storage area 323 are data stored in advance in the external memory 45 and loaded into the main memory 32 to perform the types of processing for obtaining a strange image.

In the program storage area 321, an image generation program 322 and the like are stored. The image generation program 322 is a program for causing the information processing section 31 to perform a series of processes shown in FIGS. 17 through 19, and 22 described later.

In the data storage area 323, the following are stored: camera image data 324; saved image data 325; face recognition result data 326; upper LCD display data 327; lower LCD display data 328; a face process flag 329; selection information data 330; face image data 331; texture data 332; polygon data 333; strange image data 334; and the like.

The camera image data 324 indicates an outer camera image captured by the outer capturing section 23. To perform photographing for obtaining a strange image, only the outer capturing section 23 between the outer capturing section 23 and the inner capturing section 24 is used in the present embodiment. Accordingly, the camera image data 324 is updated using the outer camera image captured by the outer capturing section 23. It should be noted that the outer capturing section 23 includes the left outer capturing section 23A and the right outer capturing section 23B, and therefore, the outer camera image includes two outer camera images acquired by the two capturing sections 23A and 23B, respectively. The update cycle of the camera image data 324 may be the same as the unit of time in which the game apparatus 10 performs processing (e.g., 1/60 seconds), or may be different from this unit of time. It should be noted that the camera image data 324 includes, as well as data of an outer camera image acquired so as to be displayed on the upper LCD 22 before photographing and so as to be used in the face recognition process, data of an outer camera image obtained by photographing (e.g., the outer camera images 50 and 51). The data of the outer camera image obtained by photographing is updated each time photographing is performed.

The saved image data 325 is data of a camera image loaded from the data storage external memory 46 (e.g., the saved image 56). The information processing section 31, which functions as storage control means, stores an image, captured in advance by the outer capturing section 23 or the inner capturing section 24, in the data storage external memory 46 by providing the image with management information indicating whether or not a face image is included in the image. The camera image thus stored in the data storage external memory 46 is loaded ahead of photographing to be performed by the outer capturing section 23, and is stored as the saved image data 325 in the data storage area 323.

The face recognition result data 326 indicates the results of the face recognition process performed on the outer camera image indicated by the camera image data 324 or the saved image indicated by the saved image data 325. The face recognition result data 326 includes, for example: data indicating whether or not recognition of a person's face has been successful by performing the face recognition process on the outer camera image or the saved image; and data indicating the area in which recognition of a face has been successful in the outer camera image or the saved image. When an outer camera image has been acquired by performing photographing using the outer capturing section 23, the game apparatus 10 randomly determines the type of image processing to be performed on the acquired outer camera image, and performs the determined type of image processing on the outer camera image. If a face image is not included in the outer camera image or the saved image, it is not possible to perform a type of image processing using face images on the outer camera image. Accordingly, the game apparatus 10 randomly determines, taking the face recognition result data 326 into account, which type of image processing is to be performed on the outer camera image. The face recognition result data 326 is updated when the face recognition process has been performed on a saved image (specifically, when the game apparatus 10 has made a transition to the photographing mode for obtaining a strange image), or when an outer camera image has been acquired by photographing performed by the outer capturing section 23.

The upper LCD display data 327 is data concerning images displayed on the upper LCD 22. The upper LCD display data 327 includes data of the substitute image 70, marker images (e.g., the marker images 71 and 72), and the like. It should be noted that the positions where the marker images are displayed are determined on the basis of data indicating the areas in which recognition of faces has been successful in the outer camera image, the data included in the face recognition result data 326.

The lower LCD display data 328 is data concerning images displayed on the lower LCD 12. The lower LCD display data 328 includes data of images of the buttons 61 through 64 (see FIG. 5), and the like.

The face process flag 329 is data indicating whether or not a face image that can be used for the type of image processing to be performed on the outer camera image is included in the saved image indicated by the saved image data 325. The face process flag 329 is set to "ON" if the saved image indicated by the saved image data 325 is provided with the management information indicating that a face image is included, and is set to "OFF" if the saved image is not provided with the management information indicating that a face image is included.

The selection information data 330 indicates information identifying the type of image processing selected as the type of image processing to be performed on the outer camera image obtained by photographing.

The texture data 332 indicates a face texture that is used to represent a face image (e.g., the face images 54, 55, and 59) to be combined with an outer camera image (e.g., the outer camera images 50 and 51), on the outer camera image using texture mapping. In the present embodiment, the texture data 329 is generated on the basis of the face image 54 and the face image 55 included in the outer camera image 51 (see FIG. 6), and the face image 59 included in the saved image 56 (see FIG. 10).

The polygon data 333 is data concerning a plurality of polygons PG (polygons PG1 shown in FIG. 24 and polygons PG2 shown in FIG. 26) that are generated on the basis of feature points of faces recognized in the face recognition processes. Here, the polygons PG1 are a plurality of polygons generated on the basis of feature points P1 through P16 (see FIG. 23) of the face of the person 74 recognized in the face recognition process performed on the outer camera image 51. The polygons PG2 are a plurality of polygons generated on the basis of feature points P21 through P36 (see FIG. 25) of the face of the person 75 recognized in the face recognition process performed on the outer camera image 51. It should be noted that in the present embodiment, a description is given of the case where the plurality of polygons PG1 are generated on the basis of the feature points P1 through P16, and the plurality of polygons PG2 are generated on the basis of the feature points P21 through P36. Alternatively, the plurality of polygons PG1 and PG2 may be generated using, for example, mouth central points A4 and B4 (see FIGS. 23 and 25) described later, instead of the feature points P1 and P21 on the respective noses. The polygon data 333 includes texture coordinate data 3331, camera image coordinate data 3332, size data 3333, inclination data 3334, and the like.

The texture coordinate data 3331 indicates the texture coordinates at which all the vertices of the polygons PG (the polygons PG1 and PG2 in the present embodiment) are placed. The camera image coordinate data 3332 indicates the camera image coordinates corresponding to all the vertices of the polygons PG (the polygons PG1 and PG2 in the present embodiment). The size data 3333 indicates the size of the face represented by a face image to be used for the type of image processing to be performed on the outer camera image. For example, the size of the face represented by the face image 54 (see FIG. 23) is represented by a horizontal size X1 and a vertical size Y1, and the size of the face represented by the face image 55 (see FIG. 25) is represented by a horizontal size X2 and a vertical size Y2. Here, the horizontal size X1 indicates the distance between a left-eye central point A1 and a right-eye central point A2 of the face indicated by the face area 81. The vertical size Y1 indicates the distance between: a midpoint A3 of a line segment α connecting the central point A1 and the central point A2; and the mouth central point A4. Further, the horizontal size X2 indicates the distance between a left-eye central point B1 and a right-eye central point B2 of the face indicated by the face area 82. The vertical size Y2 indicates the distance between: a mid point B3 of a line segment β connecting the central point B1 and the central point B2; and the mouth central point B4. A face image to be used for the type of image processing to be performed on the outer camera image is subjected to an enlargement/reduction process on the basis of the size indicated by the size data 3333, and is then combined with the outer camera image. The inclination data 3334 indicates the inclination of the face represented by the face image with respect to the horizontal direction (e.g., the inclination of the line segment α in the example shown in FIG. 23, and the inclination of the line segment β in the example shown in FIG. 25). A face image to be used for the type of image processing to be performed on the outer camera image is subjected to a rotation process on the basis of the inclination indicated by the inclination data 3334, and is then combined with the outer camera image. It should be noted that in the present embodiment, the coordinates of the points A1 through A4 and B1 through B4 are used only to obtain the sizes and the inclinations of the face areas 81 and 82, but may also be used to generate the plurality of polygons PG1 and PG2 (see FIGS. 24 and 26).

The strange image data 334 is data of a strange image obtained by performing a type of image processing on an outer camera image (the strange images 91 through 97 in the present embodiment). It should be noted that the strange image is displayed on the upper LCD 22 in a stereoscopic manner immediately after photographing has been performed, and therefore includes a left-eye image and a right-eye image. When the type of image processing on the outer camera image immediately after photographing has been completed, the strange image indicated by the strange image data 334 is displayed on the upper LCD 22 as part of the upper LCD display data 327.

It should be noted that although not shown in FIG. 16, in the data storage area 323, the following are also stored: operation data indicating the content of the operation performed on the game apparatus 10; data concerning the control of a virtual camera for displaying the appearance of a virtual game space on a screen; and the like. These items of data, however, are not directly related to the exemplary embodiments, and are not described in detail here.

[Main Process]

Figure 17:
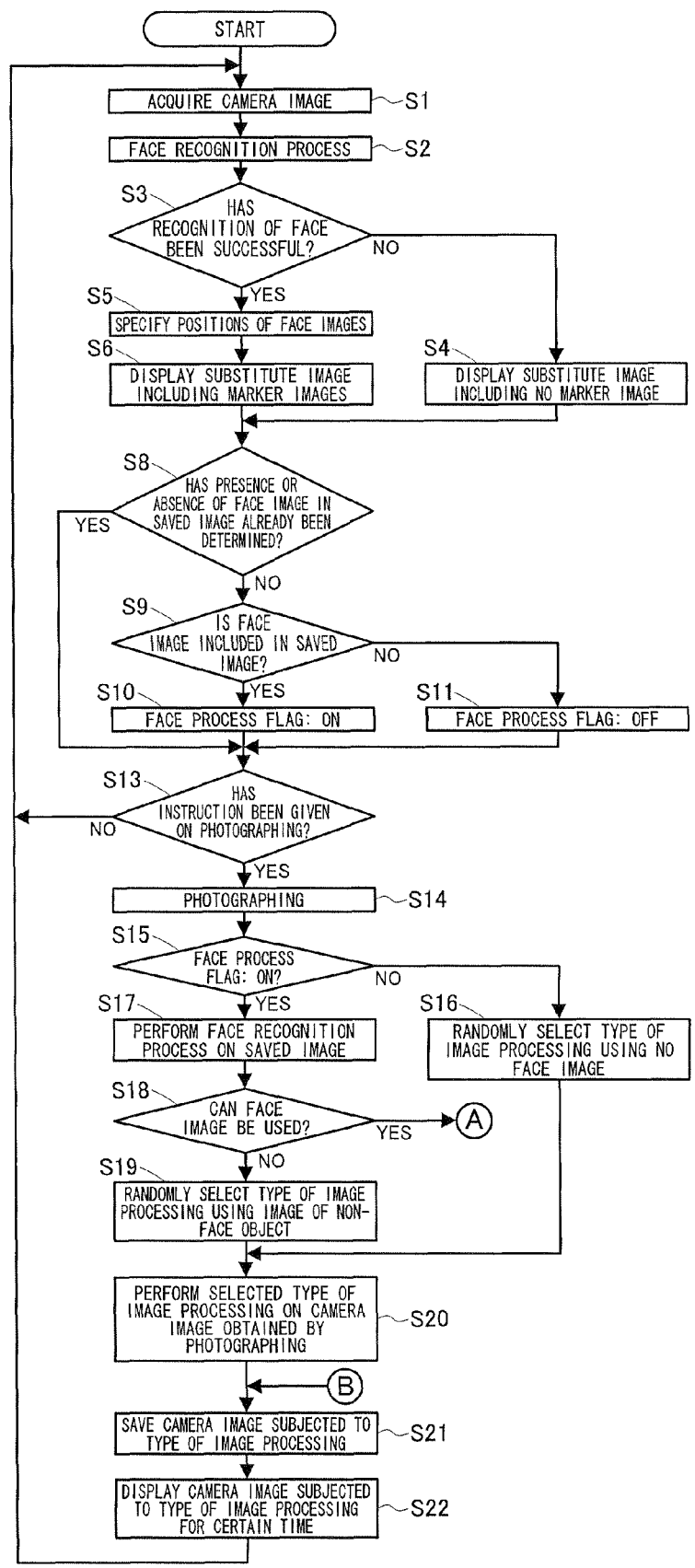
FIG. 17 is a non-limiting exemplary flow chart showing an example of processing performed by the game apparatus 10 when photographing is performed.
Figure 18:
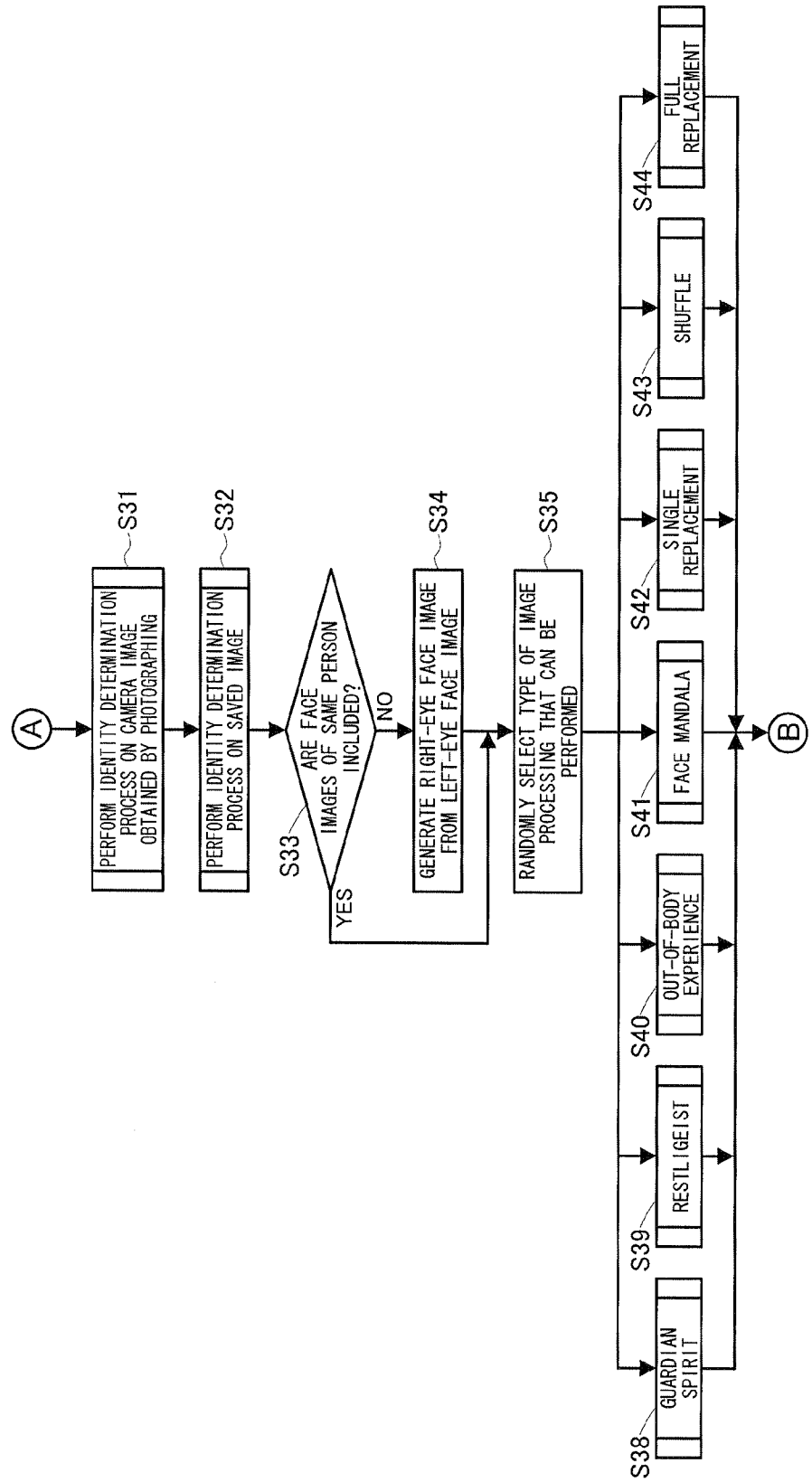
FIG. 18 is a non-limiting exemplary flow chart showing the example of the processing performed by the game apparatus 10 when photographing is performed.

Next, with reference to FIGS. 17 and 18, a description is given of a main process performed by the information processing section 31. Here, FIGS. 17 and 18 are non-limiting exemplary flow charts showing an example of processing performed by the game apparatus 10 when photographing is performed. It should be noted that a series of processes described below are performed in accordance with commands issued by the CPU 311 on the basis of the image generation program 322.

When the user has performed a predetermined operation to cause the game apparatus 10 to make a transition to a photographing mode where a strange image can be obtained, the information processing section 31 acquires a camera image as shown in FIG. 17 (step S1). Specifically, the information processing section 31 acquires an outer camera image captured in real time by the outer capturing section 23, to thereby update the camera image data 324.

Next, the information processing section 31 performs the face recognition process on the outer camera image acquired in the process of step S1 (step S2), and determines whether or not recognition of a face has been successful in the outer camera image (step S3).

When the information processing section 31 has determined that recognition of a face has not been successful (step S3: NO), that is, when, as in the outer camera image 50, an outer camera image including no face image has been acquired (see FIG. 14), the information processing section 31, which functions as second display control means, determines that no person is present in the capturing range of the outer capturing section 23, and causes the substitute image 70, including no marker image, to be displayed on the upper LCD 22 (step S4). Specifically, the information processing section 31 causes only the substitute image 70, included in the upper LCD display data 327, to be displayed on the upper LCD 22.

On the other hand, when the information processing section 31 has determined that recognition of a face has been successful (step S3: YES), that is, when, as in the outer camera image 51 (see FIG. 6), an outer camera image including face images has been acquired, the information processing section 31, which functions as position specifying means, specifies the positions of the faces included in the outer camera image acquired in the process of step S1 (step S5). Specifically, the information processing section 31 acquires the camera image coordinates of the feature points of the faces of the people 74 and 75 on the basis of, for example, the results of the face recognition process performed on the outer camera image 51 in step S2, and specifies the positions of the faces of the people 74 and 75 on the basis of the camera image coordinates. Then, the information processing section 31 causes the substitute image 70, obtained by placing marker images (e.g., the marker images 71 and 72) at the positions specified in the process of step S5, to be displayed on the upper LCD 22 (step S6).

The display process in step S4 or step S6 is continued until the process of step S22 described later is performed. That is, instead of the outer camera image captured in real time by the outer capturing section 23, the substitute image 70 not including the outer camera image is displayed on the upper LCD 22 until an outer camera image subjected to a type of image processing is displayed on the upper LCD 22. This prevents the user of the game apparatus 10 from easily guessing the content of the type of image processing from the display content of the upper LCD 22. Further, when face images representing peoples' faces are included in an outer camera image, the substitute image 70 including the marker images 71 and 72 that imply the positions of the face images, respectively, is displayed on the upper LCD 22 in the process of step S6. This enables the user to perform photographing while confirming whether or not peoples' faces are included in the capturing range of the outer capturing section 23, even if the outer camera image acquired in real time by the outer capturing section 23 is not displayed.

When the process of step S4 or step S6 has been performed, the information processing section 31 determines whether or not the presence or absence of a face image in a saved image has already been determined (step S8). As described above, if the saved image indicated by the saved image data 325 is provided with the management information indicating that a face image is included, the face process flag 329 is set to "ON". On the other hand, if the saved image is not provided with the management information indicating that a face image is included, the face process flag 329 is set to "OFF". Accordingly, in step S8, the information processing section 31 determines, on the basis of whether the face process flag 329 is set to "ON" or "OFF", whether or not the presence or absence of a face image in a saved image has already been determined. When the information processing section 31 has determined that the presence or absence of a face image has already been determined (step S8: YES), the processing proceeds to step S13 described later.

When having determined that the presence or absence of a face image in a saved image has not been determined (step S8: NO), the information processing section 31 determines whether or not a face image is included in the saved image (step S9). Specifically, with reference to the management information of the saved image stored in the data storage area 323 as the saved image data 325, the information processing section 31 determines whether or not a face image is included in the saved image. Here, if a face image is included in the saved image (step S9: YES), that is, if the saved image is provided with the management information indicating that a face image is included, the information processing section 31 sets the face process flag 329 to "ON" (step S10). On the other hand, if a face image is not included in the saved image (step S9: NO), that is, if the saved image is provided with the management information indicating that a face image is not included, the information processing section 31 sets the face process flag 329 to "OFF" (step S11).

When the process of step S10 has been performed, or when the process of step S11 has been performed, or when the determination of step S8 is "YES", the information processing section 31 determines, on the basis of the presence or absence of the operation on the L button 14G or the R button 14H, whether or not an instruction has been given on photographing (step S13). When the information processing section 31 has determined that an instruction has not been given on photographing (step S13: NO), the processing returns to step S1. It should be noted that, for example, when examples of "a type of image processing using no face image" described later include a type of image processing that needs to be performed before photographing, the processes of steps S8 through S11 may be performed ahead of step S1.

When having determined that an instruction has been given on photographing (step S13: YES), the information processing section 31, which functions as image acquisition means, performs photographing (step S14). Specifically, the information processing section 31 acquires the outer camera image captured by the outer capturing section 23 (a first captured image), to thereby update the camera image data 324 on the basis of the acquired outer camera image.

Subsequently to the process of step S14, the information processing section 31 determines whether or not the face process flag 329 is set to "ON" (step S15). When having determined that the face process flag 329 is set to "OFF" (step S15: NO), the information processing section 31 randomly selects a type of image processing using no face image, to thereby update the selection information data 330 (step S16). Examples of a type of image processing that can be selected in the process of step S16 include: a process of converting a color outer camera image obtained by the photographing performed in step S14 into a black and white image; a process of converting a color outer camera image into a sepia image; and a process of inverting the shades of all the pixels in an outer camera image. The type of image processing selected in step S16 is not limited to the processes exemplified here so long as this is a type of image processing using no face image, and may be a type of image processing using no face image that is conventionally typically performed.

Incidentally, even if the saved image is provided with the management information indicating that a face image is included, a face image that can be actually used for the type of image processing to be performed on the outer camera image may not be included in the saved image. Examples of such a case include one where, for example, a face image can be recognized in the left-eye image (an outer camera image acquired by the left outer capturing section 23A) of a saved image acquired by the outer capturing section 23 in the past, but a face image cannot be recognize in the right-eye image (an outer camera image acquired by the right outer capturing section 23B).

In response, when having determined that the face process flag 329 is set to "ON" (step S15: YES), the information processing section 31, which functions as second determination means, performs the face recognition process on the saved image indicated by the saved image data 325, to thereby update the face recognition result data 326 (step S17). Specifically, when, for example, one camera image photographed by the inner capturing section 24 in the past (hereinafter referred to as an "inner camera image") is stored as a saved image, the information processing section 31 performs the face recognition process on the saved image. Further, for example, when two outer camera images photographed by the outer capturing section 23 (the left outer capturing section 23A and the right outer capturing section 23B) in the past are stored as a saved image, the information processing section 31 performs the face recognition process on the outer camera image that has been acquired by the left outer capturing section 23A and that is to be used as the left-eye image.

With reference to the face recognition result data 326, the information processing section 31 determines whether or not the face image included in the saved image can be used for the type of image processing to be performed on the outer camera image obtained by the photographing performed in step S14 (step S18). Specifically, the information processing section 31 determines whether or not a face image can be acquired from the saved image indicated by the saved image data 325. It should be noted that when the saved image includes the left-eye image acquired by the left outer capturing section 23A and the right-eye image acquired by the right outer capturing section 23B, the information processing section 31 determines whether or not a face image can be acquired from the left-eye image. Here, when the information processing section 31 has determined that the face image can be used for the type of image processing (step S18: YES), the processing proceeds to step S31 described later (see FIG. 18). It should be noted that the reason why the face recognition process is performed on the saved image even though the face process flag 329 is set to "ON" is that even if the saved image includes the information indicating that a face image is included, there may be a case where the face cannot be recognized in the actual face recognition process.

When having determined that the face image cannot be used (step S18: NO), the information processing section 31 randomly selects a type of image processing using an image of a non-face object, to thereby update the selection information data 330 (step S19). Here, the type of image processing using an image of a non-face object is a process of combining the outer camera image acquired in the process of step S14, with an image of a non-face object (e.g., an image of a UFO) stored in advance in the data storage area 323. It should be noted that the contents of the type of image processing selected in step S19 and the type of image processing selected in step S16 are different from each other in that the type of image processing selected in step S19 is a type of image processing of combining an image of a non-face object with the outer camera image, whereas the type of image processing selected in step S16 is not a type of image processing of combining an image of a non-face object with the outer camera image.

After having selected a type of image processing in the process of step S16 or in the process of step S19, the information processing section 31 performs the type of image processing indicated by the selection information data 330 on the outer camera image obtained by the photographing performed in step S14 (step S20).

The information processing section 31 saves, as the strange image data 334 in the data storage area 323, the outer camera image subjected to the type of image processing using no face image in step S20, or the outer camera image subjected to a type of image processing using face images in any one of steps S38 through S44 described later, and also saves the outer camera image in the data storage external memory 46 (step S21).

Then, the information processing section 31, which functions as first display control means, causes the outer camera image indicated by the strange image data 334 to be displayed on the upper LCD 22 in place of the substitute image 70 for a certain time (e.g., 5 seconds) (step S22). After the process of step S22 has been performed, the processing returns to step S1. Then, the state changes to one where photographing for obtaining a new strange image can be performed.

On the other hand, when having determined that the face image included in the saved image indicated by the saved image data 325 can be used for the type of image processing to be performed on the outer camera image obtained by the photographing performed in step S14 (step S18: YES), the information processing section 31 performs, as shown in FIG. 18, an identity determination process on the outer camera image obtained by the photographing performed in step S14 (step S31), and performs an identity determination process on the saved image (step S32). Here, the identity determination process is a process of, when the outer camera image or the saved image includes an outer camera image obtained by photographing performed by the left outer capturing section 23A (hereinafter referred to as a "left camera image") and an outer camera image obtained by photographing performed by the right outer capturing section 23B (hereinafter referred to as a "right camera image"), determining whether or not the face image included in the left camera image and the face image included in the right camera image are those of the same person. Both the outer camera image and the saved image can include two images, namely the left camera image and the right camera image, and therefore, the identity determination processes are performed on both the outer camera image and the saved image in a similar manner.

When having performed the process of step S32, the information processing section 31 determines, on the basis of the results of the identity determination processes in steps S31 and S32, whether or not face images of the same person are included in the left camera images and the right camera images of both the outer camera image and the saved image acquired by the current photographing (step S33). When face images of the same person have been acquired from the left camera images and the right camera images in the identity determination processes described later, the information processing section 31 determines that face images of the same person are included (step S33: YES), and the processing proceeds to step S35 described later.

On the other hand, when having determined that face images of the same person are not included in the left camera images and the right camera images (step S33: NO), the information processing section 31 generates a right-eye face image from a left-eye face image, or right-eye face images from left-eye face images, depending on the results of step S33 (step S34). Here, the left-eye face image is a face image to be used to perform a type of image processing using face images on the left camera image acquired by the photographing performed by the left outer capturing section 23A in step S14. The right-eye face image is a face image to be used to perform a type of image processing using face images on the right camera image acquired by the photographing performed by the right outer capturing section 23B in step S14 in a similar manner. It should be noted that if the saved image is an inner camera image obtained by photographing performed by the inner capturing section 24, the process of step S34 is performed on the saved image.

When having performed the process of step S34, or when having determined that it is "YES" in step S33, the information processing section 31, which functions as image processing method selection means, randomly selects a type of image processing that can be performed on the outer camera image obtained by the photographing performed in step S14, to thereby update the selection information data 330 (step S35).

Although described in detail later, in the identity determination processes in steps S31 and S32, it is determined whether or not a face image is included in the outer camera image obtained by the photographing performed in step S14, and it is also determined whether or not a face image is included in the saved image. Then, the two determination processes clarify, among types of image processing using face images, a type of image processing that can be performed by the information processing section 31 on the outer camera image obtained by the current photographing. Accordingly, the information processing section 31 determines, on the basis of the results of the identity determination processes in steps S31 and S32, which types of image processing using face images can be performed, and randomly selects one type of image processing from among two or more types of image processing using face images.

A description is given below of types of image processing that can be selected in the process of step S35. For example, when face images are included in the outer camera image 51 (see FIG. 6) acquired by the photographing performed in step S14, it is possible to select the following types of processing as a type of image processing using the face images. That is, it is possible to select, as a type of image processing using one of the face images included in the outer camera image 51, a type of image processing (an "out-of-body experience process" in step S40) of inserting a copy of the face image 54 into the outer camera image 51 so as to be placed above the face of the person 74, in order to represent an out-of-body experience of the person 74 as shown in FIG. 7. Further, similarly, it is possible to select, as a type of image processing using one of the face images included in the outer camera image 51, a type of image processing (a "face mandala process" in step S41) of inserting copies of the face image 55 into the outer camera image 51 so as to be placed in eight directions from the face of the person 75, in order to represent the person 75 in a mandala manner as shown in FIG. 8. Further, it is possible to select, as a type of image processing using the plurality of face images included in the outer camera image 51, a type of image processing (a "shuffle process" in step S43) of replacing the face image 54 of the person 74 and the face image 55 of the person 75 with each other, as is clear from comparison between FIG. 6 and FIG. 9. It should be noted that in the present embodiment, when a face image is included in an outer camera image obtained by photographing, any one of the "out-of-body experience process", the "face mandala process", and the "shuffle process" is randomly selected. The "out-of-body experience process", however, is a process of combining a copy of the face image above the face image, and therefore, if the position of the face image included in the outer camera image is not below a certain position, the "out-of-body experience process" may not be selected. Further, the "face mandala process" is a process of combining face images around the face image, and therefore, if the size of the face image included in the outer camera image is not smaller than a certain size, the "face mandala process" may be not be selected.

In addition, when, for example, face images are included in the saved image 56 (see FIG. 10), it is possible to select the following types of processing as a type of image processing using the face images. That is, it is possible to select, as a type of image processing using, for example, the face image 59 included in the saved image 56, a type of image processing (a "guardian spirit process" in step S38) of inserting the face image 59 into the outer camera image 51 such that, as shown in FIG. 13, the faces represented by face images 59 are placed around the people 74 and 75. Further, it is possible to select, as a type of image processing using, for example, the face image 59 included in the saved image 56, a type of image processing (a "restligeist process" in step S39) of inserting the face image 59 into the outer camera image 50 such that, as shown in FIG. 15, the faces represented by face images 59 appear in the outer camera image 50 (see FIG. 14) that does not show a person's face. It should be noted that when a type of image processing using the face images included in the saved image is performed, the "guardian spirit process" may be selected if a face image is included in an outer camera image obtained by photographing, and the "restligeist process" may be selected if a face image is not included.

In addition, for example, when a face image is included in the outer camera image 51 and also a face image is included in the saved image 56, it is possible to select the following types of processing as a type of image processing using the face images. That is, it is possible to select a type of image processing (a "single replacement process" in step S42) of, as shown in FIG. 11, replacing the face image 54 representing the face of the person 74 with the face image 59 in the outer camera image 51. Further, it is possible to select a type of image processing (a "full replacement process" in step S44) of, as shown in FIG. 12, replacing both the face images 54 and 55 representing the faces of the people 74 and 75 with the face image 59 in the outer camera image 51.

As described above, in step S35, the information processing section 31 picks up two or more types of image processing using face images in accordance with whether or not a face image is included in the outer camera image obtained by the current photographing, and also with whether or not a face image is included in the saved image, and randomly selects any one type of image processing from among the picked up types of image processing. Then, the information processing section 31 performs the type of image processing selected in the process of step S35 (any one type of image processing in steps S38 through S44) on the outer camera image obtained by the photographing performed in step S14. This makes it possible to obtain any one of the strange images 91 through 97. It should be noted that there may be a case where a type of image processing using face images is inevitably determined as one type, depending on the condition such as: whether or not a face image is included in an outer camera image obtained by photographing or included in a saved image; or, when a face image is included in an outer camera image, the position and size of the face image. In such a case, a type of image processing corresponding to the condition may be selected and performed.

On the other hand, when having determined that a face image is not included in the saved image ("NO" in step S18 or "NO" in step S15), the information processing section 31, as described above, randomly selects a type of image processing using no face image.

As described above, when photographing has been performed by the outer capturing section 23, the game apparatus 10 randomly selects, as the type of image processing to be performed on the outer camera image obtained by the photographing, any one type of image processing from among a plurality of types of image processing including: two or more types of image processing using face images; and two or more types of image processing using no face image. Then, the game apparatus 10 performs the selected type of image processing on the outer camera image. It should be noted that in the present embodiment, the description is given of the case where, when the determination of step S18 in FIG. 17 is "YES", a type of image processing using the face image is always selected. Alternatively, even if a face image is saved, there may be a case where a type of image processing using no face image is selected.

[Identity Determination Process]

The outer capturing section 23 includes two capturing sections, namely the left outer capturing section 23A and the right outer capturing section 23B, and therefore, the outer camera image acquired by the outer capturing section 23 basically includes two outer camera images, namely the left camera image and the right camera image. When a type of image processing using a face image included in the outer camera image is performed in such a condition, the person represented by the face image to be used for the type of image processing to be performed on the left camera image and the person represented by the face image to be used for the type of image processing to be performed on the right camera image need to be the same person. This is because, when an image subjected to a type of image processing is displayed on the upper LCD 22 in a stereoscopic manner, if the face image inserted into the left camera image and the face image inserted into the right camera image are those of different peoples' faces, the face represented by the face image cannot be recognized as a face. The same is true in the case where a type of image processing is performed on an outer camera image, using a camera image stored as a saved image. In response, in the present embodiment, an identity determination process described below is performed on each of an outer camera image obtained by photographing, and a camera image stored as a saved image. Here, the identity determination process is a process of determining whether or not a face image included in the left camera image and a face image included in the right camera image represent the same person's face.

Figure 19:
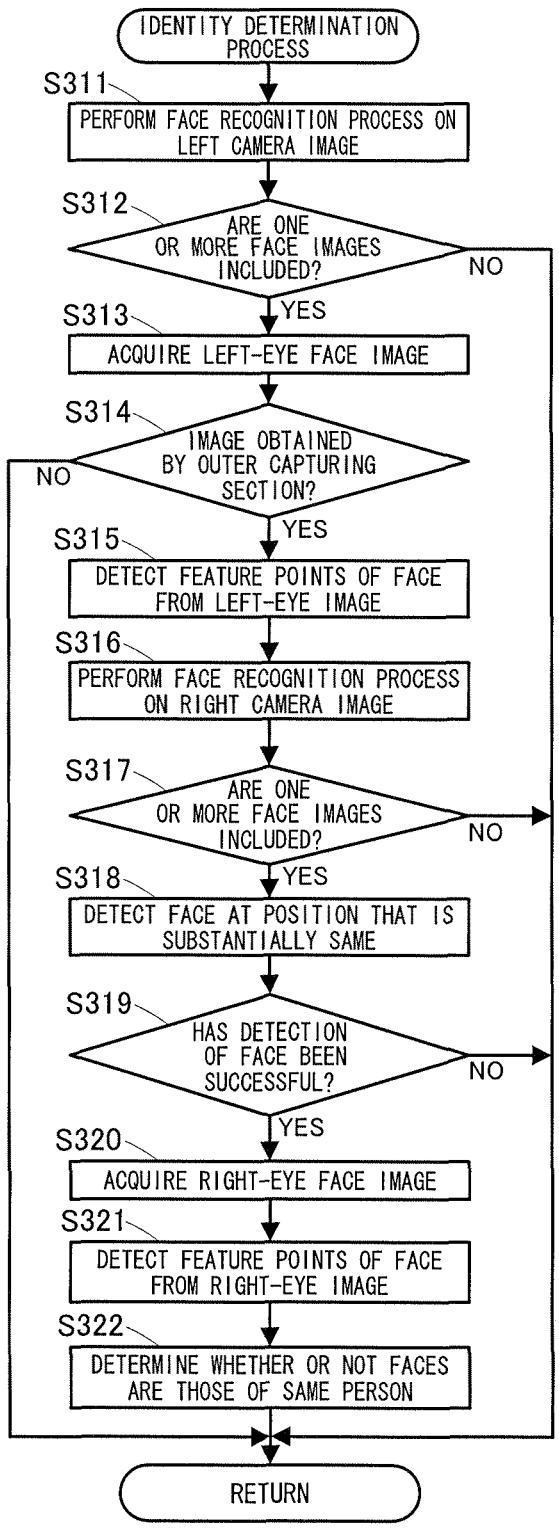
FIG. 19 is a non-limiting exemplary detailed flow chart of an identity determination process in steps S31 and S32 of FIG. 18.

With reference to FIG. 19, a description is given below of the identity determination process performed by the information processing section 31. Here, FIG. 19 is a non-limiting exemplary detailed flow chart of the identity determination process in steps S31 and S32 in FIG. 18. It should be noted that the identity determination process is performed on each of an outer camera image obtained by photographing, and a saved image stored as the saved image data 325 in the data storage area 323 before the photographing. Thus, in the following description, a series of processes of FIG. 19 are described without particularly distinguishing between an outer camera image and an inner camera image, if there is no particular problem.

The information processing section 31 performs the face recognition process on the left camera image to thereby update the face recognition result data 326 (step S311). Then, with reference to the face recognition result data 326, the information processing section 31, which functions as first determination means and the second determination means, determines whether or not one or more face images are included in the left camera image (step S312).

Incidentally, when photographing is performed using the outer capturing section 23, the outer camera image 51 including a face image may be acquired, or the outer camera image 50 including no face image may be acquired. Accordingly, for example, when the outer camera image 51 has been acquired, it is determined in step S312 that it is "YES", and the processing proceeds to step S313 described later. On the other hand, for example, when the outer camera image 50 has been acquired, it is determined in step S312 that it is "NO", and the processing proceeds to the identity determination process to be performed on the saved image in step S32.

In contrast, in the process of step S18, it is determined that in the saved image, a face image that can be used for the type of image processing to be performed on the outer camera image is included in the left camera image, and therefore, it is always determined in the process of step S312 performed on the saved image that it is "YES".

When having determined that one or more faces are included in the left camera image (step S312: YES), the information processing section 31 acquires the left-eye face image (step S313). Specifically, the information processing section 31 specifies a face area representing a person's face included in the left camera image on the basis of the results of the face recognition process in step S311, and acquires an image of the specified face area as the left-eye face image.

Subsequently to the process of step S313, the information processing section 31 determines whether or not the left camera image subjected to the face recognition process in the process of step S311 is the one obtained by photographing performed by the outer capturing section 23 (step S314). When a series of identity determination processes are performed on the camera image acquired in the process of step S14, the camera image is the outer camera image obtained by photographing performed by the outer capturing section 23. Accordingly, it is always determined in step S314 that it is "YES", and the processing proceeds to step S315 described later. On the other hand, when a series of steps of the identity determination process are performed on the saved image, if the saved image is obtained by photographing performed using the outer capturing section 23, the right camera image is present as part of the saved image data 325, and therefore, it is determined in step S314 that it is "YES", and the processing proceeds to step S315. Further, if the saved image is obtained by photographing performed using the inner capturing section 24, the left camera image subjected to the face recognition process in the process of step S311 is an inner camera image, and therefore, a right camera image is not present. Thus, it is determined in step S314 that it is "NO", and, in the process of step S34 described above, a right-eye face image is generated on the basis of the left-eye face image generated in the process of step S313.

When having determined that the left camera image from which the left-eye face image has been acquired in the process of step S313 is the one obtained by photographing performed by the outer capturing section 23 (step S314: YES), the information processing section 31 detects feature points of the face from the left-eye image (step S315). Then, the information processing section 31 performs the face recognition process on the right camera image to thereby update the face recognition result data 326 (step S316). The face recognition process is performed in a similar manner to that performed on the left camera image in step S311.

With reference to the face recognition result data 326, the information processing section 31 determines, on the basis of the results of the face recognition process in step S316, whether or not one or more face images are included in the right camera image (step S317). When the information processing section 31 has determined that one or more face images are not included in the right camera image (step S317: NO), it is determined in the process of step S33 that a face image of the same person is not present, and the processing proceeds to step S34.

When having determined that one or more face images are included in the right camera image (step S317: YES), the information processing section 31 detects a face by performing the face recognition process on a position that is substantially the same as that of the left-eye face image acquired in the process of step S313 performed on the right camera image (step S318). Then, the information processing section 31 determines whether or not the detection of a face has been successful as a result of the process of step S318 (step S319). Here, when the information processing section 31 has determined that the detection of a face has not been successful (step S319: NO), the process of step S34 described above is performed in order to obtain from the right camera image a right-eye face image representing the face of the same person as the person indicated by the left-eye face image.

When having determined that the detection of a face from the right camera image has been successful (step S319: YES), the information processing section 31 acquires from the right camera image a right-eye face image representing the face detected in the process of step S318 (step S320). Then, the information processing section 31 detects feature points of the face from the right-eye face image in a similar manner to that of the process of step S315 (step S321).

Then, the information processing section 31 determines whether or not the person having the face represented by the left-eye face image and the person having the face represented by the right-eye face image are the same person, by comparing the feature points of the face detected from the left-eye image in the process of step S315 with the feature points of the face detected from the right-eye image in the process of step S321 (step S322). The determination of step S33 described above is made using the determination result of step S322.

As described above, it is determined whether or not a left-eye face image acquired from the left camera image and a right-eye face image acquired from the right camera image are those of the same person's face, so that face images of the same person are combined with the left camera image and the right camera image included in the outer camera image obtained by the current photographing. When it is determined that the images are those of different peoples' faces, a right-eye face image of the same person having the face represented by the left-eye face image is generated from the left-eye face image in the process of step S34.

[Shuffle Process]

Figure 20:
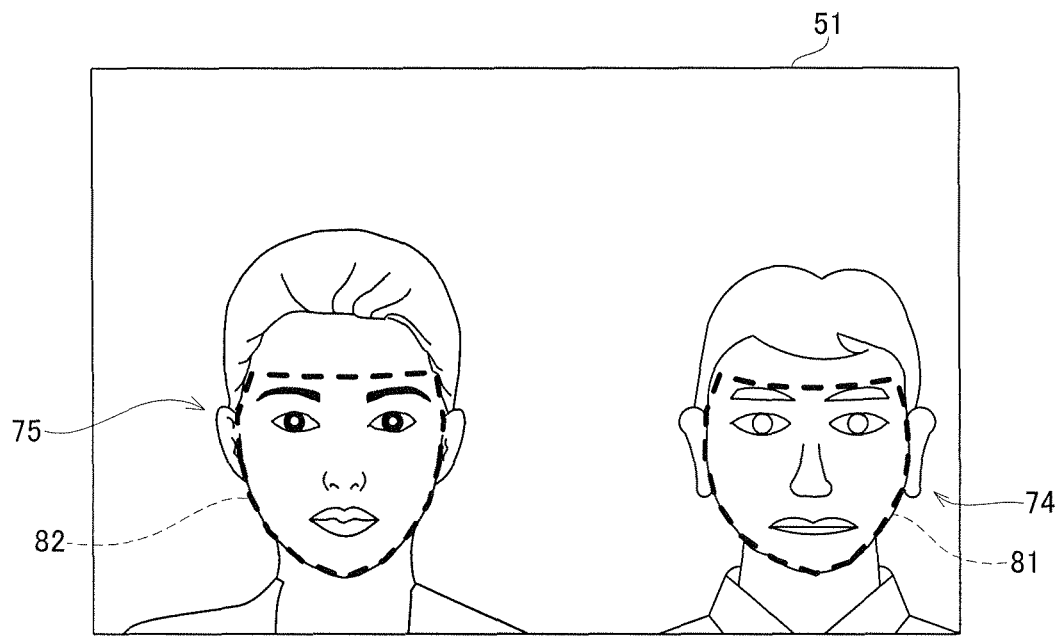
FIG. 20 is a non-limiting exemplary diagram illustrating two face areas 81 and 82 included in the outer camera image 51.
Figure 21:
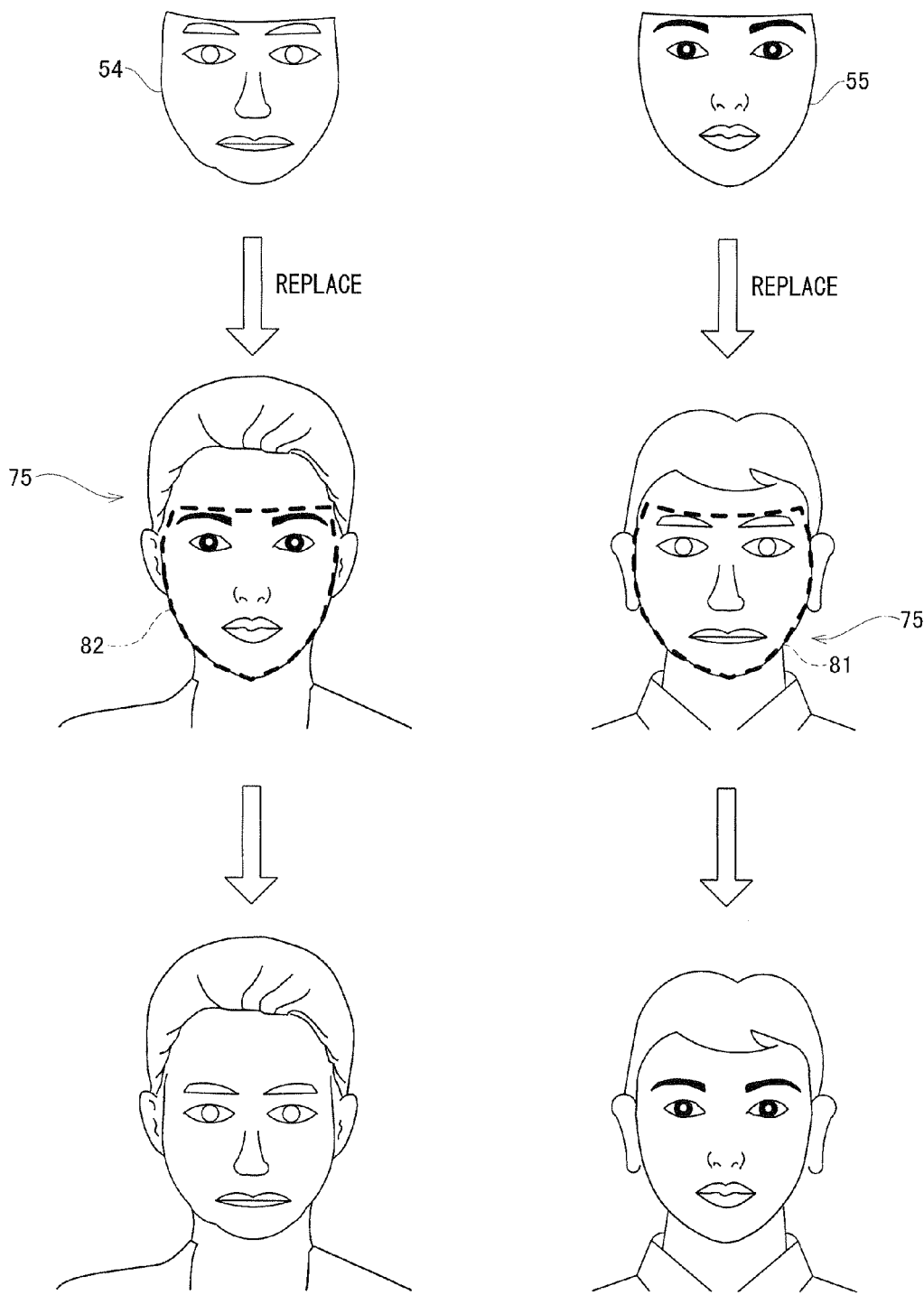
FIG. 21 is a non-limiting exemplary diagram illustrating the steps of a shuffle process of inserting the face images 54 and 55 into the outer camera image 51.
Figure 22:
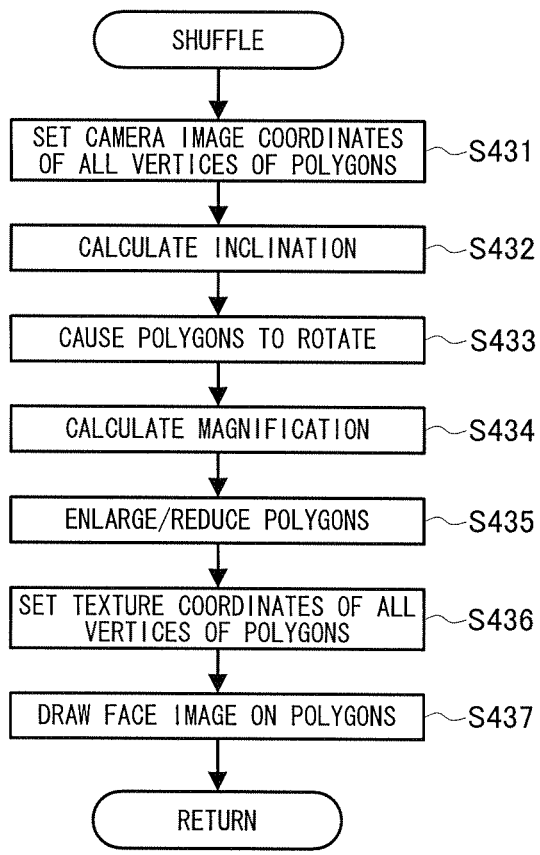
FIG. 22 is a non-limiting exemplary detailed flow chart of the shuffle process in step S43.
Figure 23:
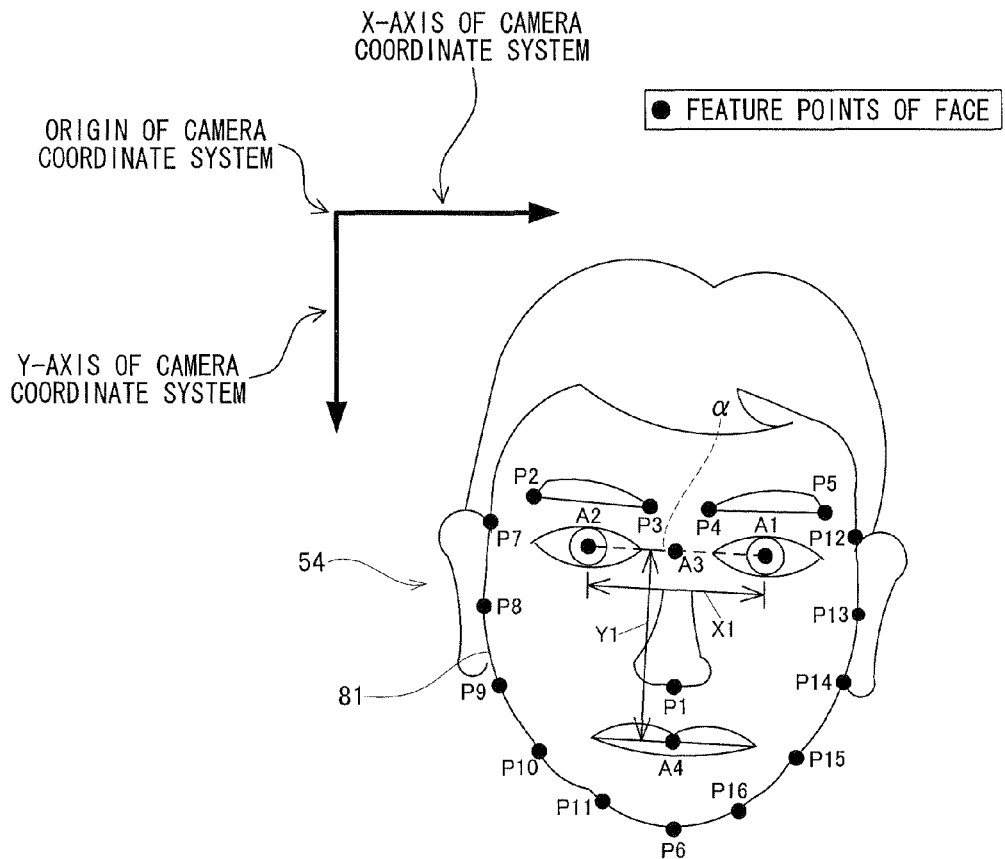
FIG. 23 is a non-limiting exemplary diagram illustrating feature points P1 through P16 that define the face area 81.
Figure 24:
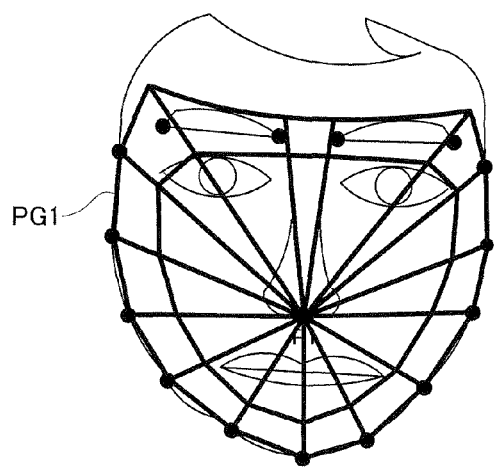
FIG. 24 is a non-limiting exemplary diagram illustrating a plurality of polygons PG1.
Figure 25:
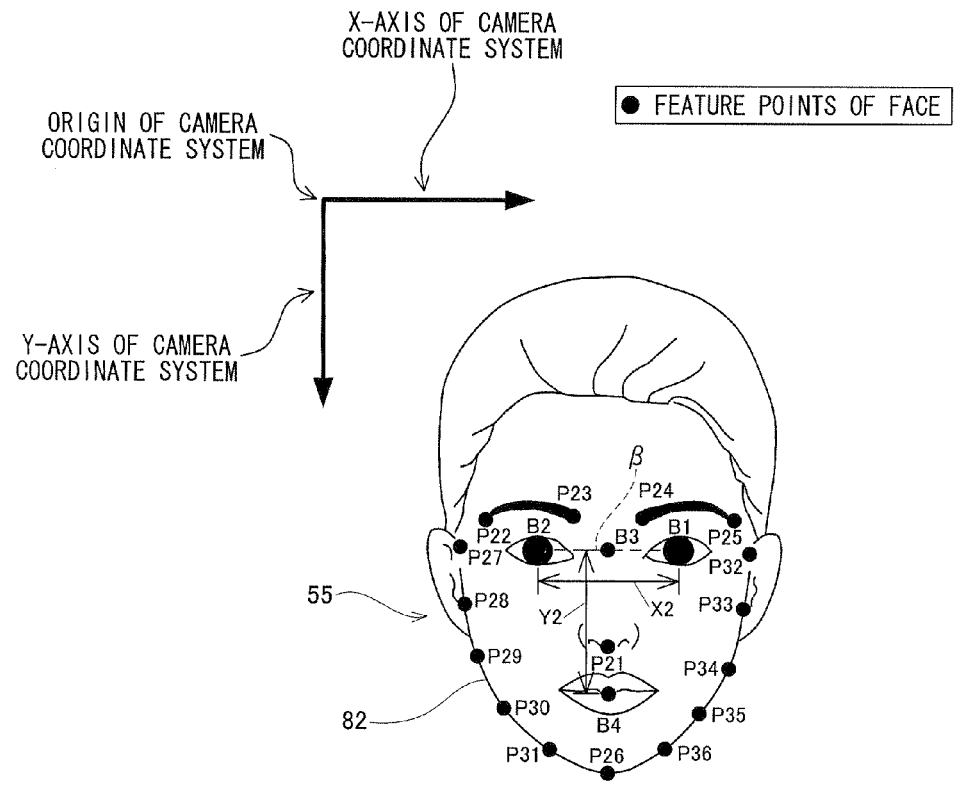
FIG. 25 is a non-limiting exemplary diagram illustrating feature points P21 through P36 that define the face area 82.
Figure 26:
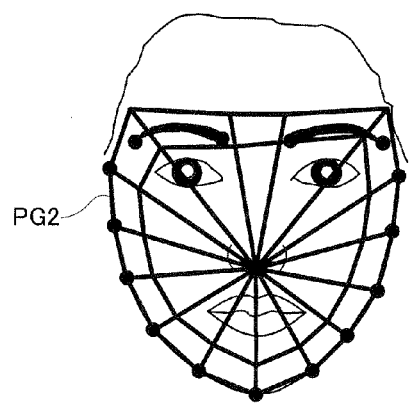
FIG. 26 is a non-limiting exemplary diagram illustrating a plurality of polygons PG2.

With reference to FIGS. 20 through 26, a description is given below of the shuffle process of step S43 as an example of a type of image processing using face images. Here, FIG. 20 is a non-limiting exemplary diagram showing two face areas 81 and 82 included in the outer camera image 51. FIG. 21 is a non-limiting exemplary diagram illustrating the steps of the shuffle process of inserting the face images 54 and 55 into the outer camera image 51. FIG. 22 is a non-limiting exemplary detailed flow chart of the shuffle process in step S43. FIG. 23 is a non-limiting exemplary diagram illustrating the feature points P1 through P16 that define the face area 81. FIG. 24 is a non-limiting exemplary diagram illustrating the plurality of polygons PG1. FIG. 25 is a non-limiting exemplary diagram illustrating the feature points P21 through P36 that define the face area 82. FIG. 26 is a non-limiting exemplary diagram illustrating the plurality of polygons PG2.

When the face images 54 and 55 of the two people 74 and 75 are included in the outer camera image 51 acquired by the current photographing, there is a case where the strange image 93 (see FIG. 9) is obtained by performing the type of image processing (the shuffle process) of replacing the face image 54 of the person 74 and the face image 55 of the person 75 with each other in the outer camera image 51. When the outer camera image 51 has been acquired, the two face areas 81 and 82 are detected as shown in FIG. 20 by performing the face recognition process on the outer camera image 51, and the two face images 54 and 55 representing the faces included in the face areas 81 and 82, respectively, are acquired. Then, as shown in FIG. 21, the two face images 54 and 55 are combined with the outer camera image 51 such that: the face image 54 is placed in the face area 82 of the person 75, which is a different person from the person 74; and the face image 55 is placed in the face area 81 of the person 74, which is a different person from the person 75.

Next, with reference to the non-limiting exemplary flow chart of FIG. 22, a more detailed description is given of the shuffle process in step S43. It should be noted that in the following description, a process of combining the face image 54 with the face area 82 of the person 75 is described. A process of combining the face image 55 with the face area 81 of the person 74, however, is performed in a similar manner to the process of combining the face image 54 with the face area 82, and therefore is not described in detail here.

When the shuffle process has been selected in the process of step S35 (see FIG. 18), the CPU 311 of the information processing section 31 sets the camera image coordinates of all the vertices of the plurality of polygons PG1 and PG2 (step S431). Specifically, the CPU 311 acquires the position of the face of the person 74 (the position of the face area 81) in the outer camera image 51 and the positions of the feature points P1 through P16 (see FIG. 23) of the face, and also acquires the position of the face of the person 75 (the position of the face area 82) in the outer camera image 51 and the positions of the feature points P21 through P36 (see FIG. 25) of the face, using the outer camera image 51 indicated by the camera image data 324, and the face recognition result data 326 resulting from the face recognition performed on the outer camera image 51. Then, the CPU 311 sets the positions of all the vertices (the camera image coordinates) of the plurality of polygons PG1 (see FIG. 24) on the basis of the positions of the feature points P1 through P16, and also sets the positions of all the vertices (the camera image coordinates) of the plurality of polygons PG2 (see FIG. 26) on the basis of the positions of the feature points P21 through P36. Then, the CPU 311 updates the camera image coordinate data 3332 corresponding to the plurality of polygons PG1 and the plurality of polygons PG2, using the set positions of all the vertices of the plurality of polygons PG1 and the plurality of polygons PG2. Here, the plurality of polygons PG1 and PG2 are set as triangles or rectangles on the basis of the plurality of feature points P1 through P16 and P21 through P36 of the recognized faces. Further, using known software, the feature points P1 through P16 and P21 through P36 of the faces are detected by performing image processing such as edge detection on the face images recognized in the outer camera image 51 obtained by photographing (the images indicated by the face areas 81 and 82), the feature points including the following 16 points in total in each face image: one point at the tip of the nose; four points at the eyebrows (two for each of the left and right ones); one point at the tip of the chin; and 10 points at the cheeks (five for each of the left and right ones). It should be noted that the positions of all the vertices of the plurality of polygons PG1 and PG2 may not need to coincide with those of the feature points P1 through P16 and P21 through P36 of the detected faces, and only need to be set at given positions on the basis of the positions of the feature points P1 through P16 and P21 through P36.

As described above, the camera image coordinates of all the vertices of the plurality of polygons PG1 and the plurality of polygons PG2 are set in the process of step S431. Consequently, the face area 81 and the face area 82 included in the outer camera image 51 are detected.

Incidentally, there is a case where the inclination of the face of the person 74 is different from the inclination of the face of the person 75. This is caused, for example, by the difference in orientation between the person 74 and the person 75 when the photographing has been performed. Further, there is also a case where the face area 81 of the person 74 and the face area 82 of the person 75 are different from each other in size. This is caused not only by the difference in relative size of face between the person 74 and the person 75, but also by the difference between: the distance between the outer capturing section 23 and the face of the person 74; and the distance between the outer capturing section 23 and the face of the person 75, when the photographing has been performed. Accordingly, if a type of image processing is performed of placing the face image 54 corresponding to the face area 81 as it is in the face area 82, an image representing a face that is interesting but very unnatural is obtained.

In response, in the present embodiment, when the face image 54 is placed in the face area 82, the rotation process and the enlargement/reduction process are performed on the face image 54.

After having set the camera image coordinates of all the vertices of the polygons PG1 and PG2 in the process of step S431, the CPU 311 calculates the inclination of the face in the face area 81 (see FIG. 20) relative to the face in the face area 82 (see FIG. 20) (step S432). Specifically, the CPU 311 obtains the inclination of the face in the face area 81 relative to the horizontal direction by calculating the inclination of the line segment α whose both ends are the left-eye central point A1 and the right-eye central point A2 of the face area 81. Further, the CPU 311 obtains the inclination of the face in the face area 82 relative to the horizontal direction by calculating the inclination of the line segment β whose both ends are the left-eye central point B1 and the right-eye central point B2 of the face area 82. Then, after having updated the inclination data 3334 using the two inclinations, the CPU 311 calculates the inclination of the face in the face area 81 relative to the face in the face area 82 by obtaining the difference between the two inclinations.

Next, the CPU 311 causes the polygons PG1 to rotate (step S433). To cause the face included in the face area 81 to rotate, it is necessary to move by rotation the positions of the feature points P1 through P16 that define the face area 81. As described above, when the positions of the feature points P1 through P16 of the face area 81 have been changed, it is necessary to move by rotation also the positions of all the vertices of the polygons PG1 set on the basis of the feature points P1 through P16. In response, in step S433, the CPU 311 changes the camera image coordinates of all the vertices of the plurality of polygons set in the process of step S431, to those of the positions resulting from the rotation movements made in accordance with the inclination calculated in the process of step S432, to thereby update the camera image coordinate data 3332 using the camera image coordinates after the change.

The performance of the process of step S433 corrects the camera image coordinates of all the vertices of the polygons PG1 such that the inclination of the face of the person 74 represented by the polygons PG1 approximately coincides with the inclination of the face of the person 75.

Subsequently to the process of step S433, the CPU 311 calculates a magnification (an enlargement ratio or a reduction ratio) for changing the sizes of the polygons PG1 (step S434). Specifically, the CPU 311 calculates, as shown in FIG. 23, the horizontal size X1 and the vertical size Y1 of the face area 81 on the basis of data indicating the face area 81 that is included in the face recognition result data 326 (here, data indicating the positions of the points A1 through A4). Further, the CPU 311 calculates, as shown in FIG. 25, the horizontal size X2 and the vertical size Y2 of the face area 82 on the basis of data indicating the face area 82 that is included in the face recognition result data 326 (here, data indicating the positions of the points B1 through B4). Then, the CPU 311 updates the size data 3333 on the basis of the calculated sizes of the face areas 81 and 82. Subsequently, with reference to the size data 3333, the CPU 311 calculates an approximate value of the magnification (the enlargement ratio or the reduction ratio) of the polygons PG1 such that the horizontal size X1 and the horizontal size X2 approximately coincide with each other, and the vertical size Y1 and the vertical size Y2 approximately coincide with each other.

Next, the CPU 311 enlarges or reduces the polygons PG1 in accordance with the magnification calculated in the process of step S434 (step S435). When the face area 81 is enlarged or reduced such that the face area 81 approximately coincides in size with the face area 82, the distances between the feature points P1 through P16 that define the face area 81 change. This makes it necessary to change the positions of all the vertices of the polygons PG1 set on the basis of the positions of the feature points P1 through P16. In response, in step S435, with reference to the camera image coordinate data 3332, the CPU 311 changes the camera image coordinates of all the vertices of the plurality of polygons PG1 changed in the process of step S433, to those of the positions resulting from the movements made by enlarging or reducing the polygons PG1 with the magnification calculated in the process of step S434, to thereby update the camera image coordinate data 3332 using the camera image coordinates after the change.

As described above, when the face image 54 has been placed in the face area 82 by changing the inclinations and the sizes of the plurality of polygons PG1, it is possible to prevent the face of the person 75 from becoming unnatural (e.g., from having a face too large for the head). It should be noted that, here, the enlargement or reduction process is performed on the plurality of polygons PG1 after the rotation process has been performed on the plurality of polygons PG1. Alternatively, the rotation process may be performed on the plurality of polygons PG1 after the enlargement or reduction process has been performed on the plurality of polygons PG1.

Subsequently, with reference to the camera image coordinate data 3332, the CPU 311 sets the positions (the texture coordinates) of all the vertices of the polygons PG1 to thereby update the texture coordinate data 3331 of the polygons PG1 on the basis of the set positions of all the vertices (step S436).

Then, the CPU 311 draws the face image 54 on the polygons PG1 (step S437). Specifically, the CPU 311 generates textures to be mapped onto the plurality of polygons PG1, respectively, on the basis of the face image 54 in the face area 81, to thereby update the texture data 332. Then, the CPU 311 maps the textures of the face image 54 indicated by the texture data 332 onto the plurality of polygons PG1, respectively, on the basis of the texture coordinates of all the vertices indicated by the texture coordinate data 3331. Then, with reference to the face recognition result data 326, the information processing section 31 draws the plurality of polygons PG1 by placing them such that a reference point of the plurality of polygons PG1 (the midpoint A3 shown in FIG. 23) coincides with a reference point of the plurality of polygons PG2 (the midpoint B3 shown in FIG. 25). At this time, alpha values indicating the transparencies of pixels are set to "0" at all the vertices of the polygons PG1 in order to reduce a feeling of discomfort between a peripheral portion of the face image 54 and the image around the face area 82.

As described above, the rotation process and the enlargement/reduction process are performed on the face image 54 such that the face image 54 of the person 74 fits in the face area 82 of the person 75, and the face image 54 subjected to the processes is combined with the outer camera image 51 so as to be placed in the face area 82. Further, the rotation process and the enlargement/reduction process are performed also on the face image 55 such that the face image 55 of the person 75 fits in the face area 81 of the person 74, and the face image 55 subjected to the processes is combined with the outer camera image 51 so as to be placed in the face area 81. This makes it possible to obtain the strange image 93 as exemplified in FIG. 9.

It should be noted that the types of image processing for obtaining the remaining strange images 91 and 92 and 94 through 97 are, similarly to the shuffle process described in the present embodiment, processes of acquiring a face image from the outer camera image 51 or the saved image 56 and combining the face image with the outer camera image 51, and therefore are not described in detail here. Further, it is needless to say that in the strange images 91 through 97 described in the present embodiment, the placement positions of the face images, the number of the face images to be combined, the angles of the face images, and the sizes of the face images are merely illustrative, and may be appropriately changed.

[Operation and Effect of the Present Embodiment]

As described above, based on the present embodiment, when an outer camera image has been acquired by photographing, it is determined whether or not a face image is included in the outer camera image. When a face image is included, any one type of image processing is randomly selected from among a plurality of types of image processing including: two or more types of image processing using face images; and two or more types of image processing using no face image. Then, the selected type of image processing is performed on the outer camera image. As described above, the randomly selected type of image processing is performed on the outer camera image. This makes it possible to obtain an unpredictable camera image subjected to a type of image processing unintended by the user of the game apparatus 10 and a person serving as a subject. It should be noted that the plurality of types of image processing include types of image processing using the face image included in the outer camera image obtained by the photographing. Thus, if a type of image processing using the face image has been selected, it is possible to obtain an image that is not only unpredictable but interesting (e.g., the strange images 91 through 93).

In addition, in the present embodiment, it is possible to select a type of image processing (e.g., the single replacement process, the full replacement process, the guardian spirit process, and the restligeist process) using a face image included in a saved image (e.g., the saved image 56) obtained by photographing performed in the past. That is, it is possible to select a type of image processing using a face image not included in an outer camera image acquired in real time. Accordingly, when a type of image processing using the face image included in the saved image has been selected and performed on the outer camera image, it is possible to obtain a strange image that is more unpredictable and interesting (the strange images 94 through 97) than the case where a type of image processing using a face image included in the outer camera image is performed on the outer camera image.

In addition, in the present embodiment, an outer camera image subjected to a type of image processing is displayed on the upper LCD 22. This enables the user of the game apparatus 10 and a person serving as a subject of photographing to easily confirm the results of the type of image processing.

Incidentally, if an outer camera image captured in real time by the outer capturing section 23 is displayed on, for example, the upper LCD 22, the user of the game apparatus 10 may easily predict the results of a type of image processing. In response, in the present embodiment, the outer camera image captured in real time by the outer capturing section 23 is not displayed, while the substitute image 70 is displayed. This makes it possible to effectively prevent the decrease in the unpredictability of a strange image obtained by performing a type of image processing.

In addition, if a face image is not included in an outer camera image obtained by photographing performed by the outer capturing section 23, it is not possible to select and perform a type of image processing using the face image. In response, in the present embodiment, the substitute image 70 (see FIG. 5) including the marker images 71 and 72 that imply the positions of the faces photographed by the outer capturing section 23 is displayed on the upper LCD 22. This enables the user to perform photographing while viewing the substitute image 70 and holding the game apparatus 10 such that all the marker images corresponding to all the people serving as subjects are displayed on the upper LCD 22, and thereby intentionally create a situation where an image subjected to a type of image processing using face images included in the outer camera image (e.g., the strange images 91 through 93) is easily obtained.

In addition, in the above embodiment, when the faces of a plurality of people have been photographed by the outer capturing section 23, it is possible to obtain an unpredictable and interesting image (the strange image 93) in which the faces of the plurality of people are replaced with each other and which therefore differs greatly from a situation in real space.

In addition, in the above embodiment, when a person's face has been photographed by the outer capturing section 23, it is possible to obtain an unpredictable and interesting image (the strange images 91 and 92) in which a face appears as in a ghost picture at a position where it should not be and which therefore differs greatly from a situation in real space.

In addition, in the above embodiment, it is possible to obtain an unpredictable and interesting image (the strange images 96 and 97) in which a face not present in front of the game apparatus 10 (a face not included in the capturing range of the outer capturing section 23) appears and which therefore differs greatly from a situation in real space.

In addition, in the above embodiment, it is possible to obtain an unpredictable and interesting image (the strange images 94 and 95) in which a face that should be included in an outer camera image obtained by photographing appears as a face not present in front of the outer capturing section 23, and which therefore differs greatly from a situation in real space.

Incidentally, when a type of image processing using face images has been selected consecutively in a plurality of photographing operations, the unpredictability of an image to be obtained by performing a type of image processing may decrease. Based on the above embodiment, a type of image processing using face images and a type of image processing using no face image are randomly selected. Accordingly, an image subjected to a type of image processing using face images may be obtained, or an image subjected to a type of image processing using no face image may be obtained. This makes it possible to suppress the decrease in the unpredictability of an image to be obtained by performing a type of image processing.

[Variations]

It should be noted that the exemplary embodiments are not limited to the above embodiment, and may be the following forms. That is, in the above embodiment, the description is given of the case where a type of image processing using a face image included in a saved image obtained by photographing performed in the past can be performed. Alternatively, a face image included in the saved image may not be used for a type of image processing to be performed on an outer camera image obtained by photographing.

In addition, in the above embodiment, the description is given of the case where a strange image is obtained by performing a type of image processing on an outer camera image obtained by photographing performed by the outer capturing section 23. Alternatively, a strange image may be obtained by performing a type of image processing on an inner camera image obtained by photographing performed by the inner capturing section 24.

In addition, in the above embodiment, the description is given of the case where an image obtained by performing a type of image processing (e.g., the strange images 91 through 97) is displayed on the upper LCD 22. Alternatively, the image obtained by the type of image processing may be displayed on the lower LCD 12. In this case, the lower LCD 12 functions as display means. Further, if the image obtained by the type of image processing is displayed on, for example, the screen of a liquid crystal television connected to the game apparatus 10 so as to communicate therewith, the image obtained by the type of image processing does not necessarily need to be displayed in the game apparatus 10.

In addition, in the above embodiment, the description is given of the case where the strange images 91 through 97 displayed in a stereoscopic manner are obtained using the outer capturing section 23 as a stereo camera. Alternatively, a strange image displayed in a planar manner may be obtained using the outer capturing section 23 as a non-stereo camera.

In addition, in the above embodiment, the description is given of the case where the substitute image 70 including the marker images 71 and 72 is displayed on the upper LCD 22. Alternatively, the marker images 71 and 72 may not be displayed.

In addition, in the above embodiment, the description is given of the case where the substitute image 70 is displayed on the upper LCD 22 instead of an outer camera image acquired in real time by the outer capturing section 23, until photographing is performed. Alternatively, the outer camera image acquired in real time may be displayed. In this case, however, the user of the game apparatus 10 may be able to easily predict the results of a type of image processing. Thus, it is preferable that as described in the above embodiment, the substitute image 70 should be displayed without causing the outer camera image acquired in real time to be displayed.

In addition, in the above embodiment, the descriptions are given, by way of example, of the case where the exemplary embodiments are applied to the hand-held game apparatus 10. Alternatively, the exemplary embodiments may be applied to not only a game apparatus but also a given hand-held electronic device such as a personal digital assistant (PDA) or a mobile phone.

In addition, in the above embodiment, the description is given, by way of example, of the case where the game apparatus 10 performs all of the processing until a strange image is obtained. Alternatively, some of the processing may be performed by another device. For example, when the game apparatus 10 is connected to another device so as to communicate therewith (e.g., a server or another game apparatus), the process steps in the non-limiting exemplary flow chart described above may be performed by the cooperation of the game apparatus 10 and said another device as one capturing system. Further, in the above embodiment, the processing of the non-limiting exemplary flow chart described above is performed in accordance with the execution of a predetermined program by the information processing section 31 of the game apparatus 10. Alternatively, some or all of the processing may be performed by a dedicated circuit provided in the game apparatus 10.

In addition, the shape of the game apparatus 10, the number of capturing sections, the placements of capturing sections, the capturing directions of capturing sections, and the like are merely illustrative, and it is needless to say that the exemplary embodiments can be achieved with other shapes, numbers, placements, and the like. Further, the processing orders, the setting values, the criterion values, and the like that are used in the main process described above are also merely illustrative, and it is needless to say that the exemplary embodiments can be achieved with other orders and values.

In addition, the image generation program may be supplied to the game apparatus 10 not only from an external storage medium, such as the external memory 45 or the data storage external memory 46, but also via a wireless or wired communication link. Further, the image generation program may be stored in advance in a non-volatile storage device of the game apparatus 10. It should be noted that examples of an information storage medium having stored thereon the program may include a CD-ROM, a DVD, and another given optical disk storage medium similar to these, a flexible disk, a hard disk, a magnetic optical disk, and a magnetic tape, as well as a non-volatile memory. Furthermore, the information storage medium for storing the program may be a volatile memory that temporarily stores the program, such as a RAM.

The exemplary embodiments can be applied to a computer-readable storage medium having stored thereon an image generation program to be executed by a computer of a capturing apparatus that uses a face recognition function to perform image processing on a captured image obtained by capturing the face of a person or the like, a capturing apparatus, a capturing system, an image generation method, and the like.

While certain example systems, methods, devices and apparatuses have been described herein, it is to be understood that the appended claims are not to be limited to the systems, methods, devices and apparatuses disclosed, but on the contrary, are intended to cover various modifications and equivalent arrangements included within the spirit and scope of the appended claims.

What is claimed is:

1. A computer-readable storage medium having stored thereon an image generation program to be executed by a computer of a capturing apparatus, the image generation program causing the computer to perform at least:

image acquisition means for acquiring, as a first captured image, an image captured by a capturing section;

first determination means for determining whether or not a face image representing a face is included in the first captured image acquired by the image acquisition;

image processing method selection means for, when the first determination has determined that a face image is included in the first captured image, randomly selecting any one type of image processing from a plurality of types of image processing including a type of image processing using the face image; and image processing means for performing the type of image processing selected by the image processing method selection means on the first captured image.

2. The non-transitory computer-readable storage medium having stored thereon the image generation program according to claim 1, the image generation program further causing the computer to perform:

storage control means for storing, as a second captured image in a memory, an image captured in advance by the capturing section; and second determination means for determining whether or not a face image representing a face is included in the second captured image, wherein when the second determination means has determined that a face image is included in the second captured image, the image processing method selection means randomly selects any one type of image processing from the plurality of types of image processing including a type of image processing using the face image.

3. The non-transitory computer-readable storage medium having stored thereon the image generation program according to claim 1, the image generation program further causing the computer to perform:

first display control means for causing the first captured image, on which the image processing means has performed the type of image processing, to be displayed on display means included in the capturing apparatus.

4. The non-transitory computer-readable storage medium having stored thereon the image generation program according to claim 1, the image generation program further causing the computer to perform:

second display control means for causing, instead of an image captured in real time by the capturing section, a substitute image to be displayed on display means included in the capturing apparatus, the substitute image not including the image captured in real time by the capturing section.

5. The non-transitory computer-readable storage medium having stored thereon the image generation program according to claim 4, the image generation program further causing the computer to perform:

position specifying means for specifying a position of a face image representing a face included in the image captured in real time by the capturing section, wherein the second display control means causes the substitute image, including a marker image that implies the position of the face image specified by the position specifying, to be displayed on the display.

6. The non-transitory computer-readable storage medium having stored thereon the image generation program according to claim 1, wherein the first determination determines whether or not a plurality of face images are included in the first captured image, and when the first determination has determined that a plurality of face images are included in the first captured image, the image processing method selection randomly selects any one type of image processing from the plurality of types of image processing including a type of image processing of replacing the plurality of face images with each other.

7. The non-transitory computer-readable storage medium having stored thereon the image generation program according to claim 1, wherein when the first determination has determined that a face image is included in the first captured image, the image processing method selection randomly selects any one type of image processing from the plurality of types of image processing including a type of image processing of copying the face image and inserting a copy of the face image into the first captured image.

8. The non-transitory computer-readable storage medium having stored thereon the image generation program according to claim 2, wherein when the second determination means has determined that a face image is in the second captured image, the image processing method selection randomly selects any one type of image processing from the plurality of types of image processing including a type of image processing of inserting the face image into the first captured image.

9. The non-transitory computer-readable storage medium having stored thereon the image generation program according to claim 2, wherein when the first determination has determined that a face image is included in the first captured image, and also the second determination has determined that a face image is included in the second captured image, the image processing method selection randomly selects any one type of image processing from the plurality of types of image processing including a type of image processing of replacing the face image included in the first captured image with the face image included in the second captured image.

10. The non-transitory computer-readable storage medium having stored thereon the image generation program according to claim 2, wherein when the second determination means has determined that a face image is not included in the second captured image, the image processing method selection means randomly selects a type of image processing using no face image.

11. The non-transitory computer-readable storage medium having stored thereon the image generation program according to claim 1, wherein the image processing using the face image is an image processing that uses a copy image obtained by copying the face image that is determined as being included in the first captured image.

12. A capturing apparatus comprising:

an image acquisition unit configured to acquire, as a first captured image, an image captured by a capturing camera;

and a computer configured to perform at least;

determining whether or not a face image representing a face is included in the first captured image acquired by the image, acquisition unit;

when the determining has determined that a face image is included in the first captured image, randomly selecting any one type of image processing from a plurality of types of image processing including a type of image processing using the face image; and performing the selected type of image processing on the first captured image.

13. A capturing system comprising:
 image acquisition unit configured to acquire, as a first captured image, an image captured by a capturing camera;
 and a computer configured to perform at least;
 determining whether or not a face image representing a face is included in the first captured image acquired by the image acquisition unit;
 when the determining has determined that a face image is included in the first captured image, randomly selecting any one type of image processing from a plurality of types of image processing including a type of image processing using the face image; and
 performing the selected type of image processing on the first captured image.

14. An image generation method to be performed by a capturing apparatus, the image generation method comprising:
 acquiring, as a first captured image, an image captured by a capturing section;
 determining whether or not a face image representing a face is included in the acquired first captured image;
 randomly selecting, when it is determined that a face image is included in the first captured image, any one type of image processing from a plurality of types of image processing including a type of image processing using the face image; and
 performing the type of image processing selected in the selection step on the first captured image.

* * * * *